(12) United States Patent
Soni et al.

(10) Patent No.: US 12,335,129 B2
(45) Date of Patent: *Jun. 17, 2025

(54) SECURE MESSAGE PROCESSING PROTOCOL

(71) Applicant: Chicago Mercantile Exchange Inc., Chicago, IL (US)

(72) Inventors: Priteshkumar Soni, Naperville, IL (US); Madhur Sirohi, Naperville, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,502

(22) Filed: May 19, 2023

(65) Prior Publication Data

US 2023/0291675 A1 Sep. 14, 2023

Related U.S. Application Data

(63) Continuation of application No. 17/112,620, filed on Dec. 4, 2020, now Pat. No. 11,695,677.

(51) Int. Cl.
*H04L 43/18* (2022.01)
*H04L 43/106* (2022.01)
(Continued)

(52) U.S. Cl.
CPC ............ *H04L 43/18* (2013.01); *H04L 43/106* (2013.01); *H04L 47/32* (2013.01); *H04L 47/34* (2013.01); *H04L 69/163* (2013.01)

(58) Field of Classification Search
CPC ....... H04L 43/18; H04L 43/106; H04L 47/32; H04L 47/34; H04L 69/163
See application file for complete search history.

(56) References Cited

U.S. PATENT DOCUMENTS 8,027,940 B2 9/2011 Li et al.
9,792,651 B2 10/2017 Simonoff
(Continued)

FOREIGN PATENT DOCUMENTS

WO 2018202282 A1 11/2018

OTHER PUBLICATIONS

"Notice of Summary Access Denial", CME Group, Jan. 5, 2017, 2 pages, http://www.cmegroup.com/notices/disciplinary/2016/11/NOTICE-OF-EMERGENCY-ACTION/NYMEX-16-0600-ELDORADO-TRADING-GROUP-LLC.html#pageNumber=1.
(Continued)

*Primary Examiner* — Nam T Tran
(74) *Attorney, Agent, or Firm* — Lempia Summerfield Katz LLC

(57) ABSTRACT

A system and method for processing electronic data messages mitigate the transmission of one or more electronic messages including a sequence of data as a plurality of packets characterized by a sequence therebetween corresponding to the sequence of the data of the electronic message, each packet including data indicative of the sequence of that packet relative to the others of the plurality of packets, to a receiving system, prior to the sender determining that the message(s) is/are desired, alone or in conjunction with subsequently canceling or otherwise invalidating the message(s). The system and method mitigate such behavior by adding a timestamp when the packets are received, detecting if at least one of the received augmented packets of the electronic data message was received by the network interface in an order different from the sequence between the plurality of packets, and taking an action with respect to the electronic data message.

28 Claims, 17 Drawing Sheets

(51) Int. Cl.
*H04L 47/32* (2022.01)
*H04L 47/34* (2022.01)
*H04L 69/163* (2022.01)

(56) References Cited

U.S. PATENT DOCUMENTS

| | | | |
|---|---|---|---|
| 10,110,350 | B2 | 10/2018 | Poudes et al. |
| 11,263,694 | B2* | 3/2022 | Mannix ............... H04L 43/0852 |
| 2013/0297478 | A1 | 11/2013 | Mannix |
| 2015/0088726 | A1 | 3/2015 | Aisen et al. |
| 2015/0127516 | A1 | 5/2015 | Studnitzer et al. |
| 2015/0356679 | A1 | 12/2015 | Schmitt |
| 2017/0193083 | A1 | 7/2017 | Bhatt |
| 2018/0130131 | A1 | 5/2018 | Simonoff |
| 2018/0183901 | A1* | 6/2018 | Lariviere ................ H04L 47/10 |
| 2018/0276751 | A1 | 9/2018 | Kavanagh et al. |

OTHER PUBLICATIONS

"Piggybacking Data on TCP ACK", Perl Monks, Jun. 16, 2011, 4 pages, http://www.perlmonks.org/?node_id=910004.

"Research Report: The Arista 7124FX Switch as a High Performance Trade Execution Platform", Argon Design, Sep. 2013.

Don Bollerman, "A NYSE Speed Bump You weren't Aware of", IEX, Retrieved Dec. 20, 2017, 4 pages, https://extrading.com/about/press/op-ed/.

Examination Report from EP Application No. 21 208 512, Jan. 31, 2023, CT.

Extended European Search Report, from EP Application No. 19198474, Dec. 12, 2019, EP.

Extended European Search Report, from EP Application No. 21208512.0, Mar. 31, 2022, EP.

Hao Shang et al., "Making Better Use of All Those TCP ACK Packets", Computer Science Technical Report Series, Worcester Polytechnic Institute, Jul. 2005, 10 pages.

Link 2 Binary Order Entry, CME Group, 17 pages, available as early as Dec. 4, 2020.

Link 3—Simple Binary Encoding, CME Group, 8 pages, available as early as Dec. 4, 2020.

International Search Report and Written Opinion, from PCT/US2017/067911, Mar. 20, 2018, WO.

John Mccrank, "U.S. Sec puts Chicago Stock Exchange 'speed bump' on hold", Reuters, Oct. 26, 2017, 10 pages.

Mavroudis, Vasilios, Bounded Temporal Fairness for FIFO Financial Markets, Springer, Published: Aug. 21, 2020. (Year: 2020).

Mike O'Hara, "How to Reduce Latency by Running Trading Algorithms in a Switch", The Trading Mesh, Oct. 7, 2013, 3 pages, http://www.thetradingmesh.com/pg/blog/mike/read/125000/how-to.

Mike O'Hara, "How to Run 20-plus Pre-Trade Risk Checks in Under a Microsecond", The Trading Mesh, Sep. 20, 2011, 5 pages, http://www.thetradingmesh.com/pg/blog/mike/read/7271/how-to-r.

* cited by examiner

SECURE MESSAGE PROCESSING PROTOCOL

REFERENCE TO RELATED APPLICATIONS

This application is a continuation under 37 C.F.R. 1.53 (b) of U.S. patent application Ser. No. 17/112,620 filed Dec. 4, 2020, now U.S. Pat. No. 11,695,677, the entire disclosure of which is incorporated by reference herein.

BACKGROUND

Transaction processing systems may rely upon electronic messages which are exchanged or otherwise communicated, such as via a network, e.g. the Internet, between the transaction processing system and the users of that system, and/or between other systems, to facilitate/implement the functionality of the transaction processing system. This exchange of messages may utilize particular communication protocols which may be standardized and well publicized so as to ease use of the systems, to ensure compatibility with other systems and communications media, and/or to facilitate use, development of and/or interaction with third party components. Multiple types of messaging protocols may be used, in combination and/or for different purposes. These protocols may be further defined or otherwise adapted to provide for efficient use of the communication medium, support for varying types and/or sizes of messages, secure transmission and/or reliable delivery of the messages communicated therewith. One such protocol is the Transport Control Protocol ("TCP").

Current communication technology may cause several problems related to latency in the electronic trading systems. For example, when two or more market participants compete for the same trading opportunity in the electronic trading system, the first participant to reach the point of matching priority determination wins. Because of that, many market participants compete with each other on latency. Some latency sensitive customers, such as high frequency traders (HFTs), leverage various techniques to try to gain microsecond-level speed improvements.

However, some of these techniques may result in an increased operational risk for the Exchange trading infrastructure, such as the market segment gateway ("MSGW") described herein. Two such techniques to try to gain microsecond level speed improvements include delayed messaging and transmission control protocol (TCP) retransmissions. Both techniques leverage the intricacies of the TCP implementation in order to transmit messages to the Exchange in an advantageous manner.

For example, in general, data communications involve at least three agents: computers, networks, and applications, i.e., trading applications used by market participants. These applications execute on computers that typically support multiple simultaneous applications. Computers are connected to networks and the data to be exchanged is transferred by the network from one computer to another. Thus, the transfer of data to the computer involves first getting the data to the computer in which the application resides and then getting it to the intended application within the computer. For successful communication, each entity in the overall system must have a unique address. For example, each computer on the network must have a unique address; this allows the network to deliver data to the proper computer. Further, each application on a computer has an address that is unique within that computer; this allows the transport layer (TCP) to support multiple applications at each computer. These latter addresses are known as service access points (SAPs), or ports, connoting the fact that each application is individually accessing the services of the transport layer (TCP).

In an example, a first participant, i.e., a market participant, may request that an application associated with a first port at a first computer send a data message to another application, associated with a second port at a second computer, i.e., an Exchange computer. The application at the first computer hands the message over to its transport layer (TCP) with instructions to send it to the second computer. To control this operation, control information, as well as user data must be transmitted. The sending process generates a block of data containing the message(s) to be transmitted and passes this to TCP. TCP may break this block of data into smaller pieces to make it more manageable. To each of these pieces, TCP appends control information known as a TCP header forming a TCP segment. For example, items in this header may include but are not limited to a source port, a destination port, a sequence number, and a checksum. The header format for TCP has a minimum length of 20 octets or 160 bits. The source port is a 16 bits field and identifies the application at the source computer. The destination port is a 16 bits field and identifies the application at the destination computer. The checksum is a 16-bit frame check sequence used to detect errors in the TCP segment. The sequence number is a 32 bits field and provides flow control and error control. Using the sequence number field, TCP numbers the segments that it sends to the particular destination port sequentially, so that if they arrive out of order, the TCP entity at the second computer can reorder them in the order in which the originating TCP received them from the application.

Delayed messaging may occur with some transmission protocols between a sender and a receiver when the sender intentionally holds back a portion, e.g., an event dependent portion, of the electronic message while sending the other portions of the electronic message. In delayed messaging, a sender wishing to send a message via TCP but wishing to hold back an event dependent portion of the message, provides only part of the message to TCP, holding back the event dependent portion which may be from any part of the overall message. TCP, unaware that it has not received the entire message, then processes and sends the partial message as it normally would, using one or more packets sent in sequence. The sender, upon the occurrence of the event, then provides the remaining portion of the message to TCP for transmission which TCP then places in one or more packets, in sequence with the prior sent packets, and sends it/them off. At the receiver, the packets are received in sequence, albeit with a delay between the second to last and the last to be received packet(s). When all of the packets are received and the message is reassembled in the packet sequence, the entire message is present and complete but the held back portion will be placed at the end of the message which may not be in the order of the original message. If the order of the parts of the message is not important or required by the application, then this will have no effect. For example, the sender may choose to send most of the electronic trading message using a transmission protocol such as the Financial Information Exchange ("FIX") protocol to the MSGW but withholds portions of the electronic trading message that include fields such as price and quantity until such time as a market driven event encourages them to complete their trade. After the market driven event occurs, the market participant may decide whether the electronic trading message is desired. If the market participant decides that the electronic trading message is desired, using the delayed messaging technique, the market participant need only send the remaining portions of the electronic trading message that include the omitted fields which meet up with the previously transmitted portions which are already buffered at the receiver. As FIX places no requirements on the order in which the message data fields are sent or received, the complete message, with the critical fields appearing at the end, will be processed by the trading system. Accordingly, a market participant is able to maximize the amount of time they have to make critical event dependent decisions. Further, the remaining portions of the message are necessarily smaller than a complete message and thus they take less time to send. Therefore, the trade is received and matched quicker than other market participants that send their complete trade message only after the occurrence of the event. On the other hand, after the market driven event occurs, if the market participant decides that the electronic trading message is no longer desired, the market participant may not send the portions including the omitted fields, or instead send corrupted portions, thereby canceling the undesired electronic trading message.

In TCP retransmissions, the sender provides all or some of their message to TCP but manipulates the TCP to hold back one or more packets, which in the packet sequence would contain that portion of the message that the sender wishes to delay. As opposed to delayed messaging, TCP will then send the remaining packets in sequence with a gap where the held message would have been sent. The receiver sees the packets arrive, buffers those packets and detects the missing packet(s). The receiver's TCP may then issue a retransmission request. While waiting, the receiver keeps the received packets in its buffer awaiting the missing packet(s). When the missing packet(s) is/are received, the receiver assembles the message based on the packet sequence with the message therefore being reassembled in the original order, as opposed to out of order as with delayed messaging. TCP retransmissions can be used on a single message divided among multiple packets or multiple messages divided among multiple packets in the transmitted sequence, e.g., one message per packet, as the receiver will buffer all of the packets of a given sequence of packets until the missing packet(s) is/are received. For example, when using the TCP retransmission technique, some market participants may send part of the message, for example, packets 1 and 3-10 but omit packet 2 until a market driven event occurs that warrants the completion of the message. Packet 2, for example, may contain the price field for the trade order. When the market driven event occurs and the market participant determines that the message is desired and the market participant knows what data he/she wishes to send, e.g., what price, the TCP retransmission technique allows the market participant to generate and/or send the omitted packet 2 at that time. When the market driven event occurs and the market participant determines that the message is no longer desired, the market participant may cancel the message by failing to send the remaining packets or by invalidating the message by sending corrupt packets. The TCP retransmission technique is more complicated and expensive to implement than the delayed messaging technique described above since TCP retransmissions require a change in the low level TCP protocol to allow for a gap in the packet transmission sequencing on the sender's computer whereas delayed messaging merely requires the sender to hold back the delayed information from their TCP.

With prior trade messaging protocols, e.g., the FIX protocol, the delayed messaging technique allowed a trader to hold back critical portions of a message, e.g., the price field, and send that portion only once critical information was learned. The FIX protocol does not enforce a particular order in which portions of a FIX message must be received so the price field coming at the end of the message would have no effect on the processing of the trade order. Generally, the use of delayed messaging could be detected as typical trade messages do not require more than one packet to send. Therefore, if a trade message is received across multiple packets, it may be assumed that the sender is using delayed messaging.

Newer trade messaging protocols, such as iLink 3.0, use a binary format which enforces a strict ordering on the fields within the message. If the message fields are received out of order, the message will be rejected. Accordingly, delayed messaging may not be used with such protocols as the sender can no longer hold back particular fields of information from being sent if those fields will be sent out of order. Further, these newer protocols intentionally require critical data fields to appear first in a trade message negating any benefit of using delayed messaging even with ordered transmission.

However, the TCP retransmission technique may still be used with these newer protocols as, with TCP retransmissions, the message, upon receipt of all packets, will be reassembled, despite the delay in receiving some packet(s), by the receiver in the correct order based on the packet sequencing. Further, the TCP retransmission technique can be used by a sender to front load multiple trade orders, each taking one or more packets, by sending all of the packets for those orders but for one or more packets being held back. The receiver will buffer all of the received packets until the missing packet(s) is/are received, essentially allowing the sender to front load their data transfer, or otherwise establish priority in the receiving buffer, prior to a critical event and then send the missing packet(s) to complete the one or more messages. Again, this allows a trader to maximize the window over which they can capitalize on critical information, reduces the effective latency of transmitting their trade orders relative to such information, allows them to establish priority as compared to other traders with respect to such information, and may allow them to consume processing resources at the Exchange thereby limiting or denying access to others.

The complex nature of the TCP retransmission technique means that it may easily be implemented and executed incorrectly. There can be a risk to the Exchange trading infrastructure if a customer uses this technique and, for example, intentionally or inadvertently floods the input, e.g., the MSGW, with malformed packets, effectively causing a denial of service for legitimate messages.

DETAILED DESCRIPTION

Figure 1:
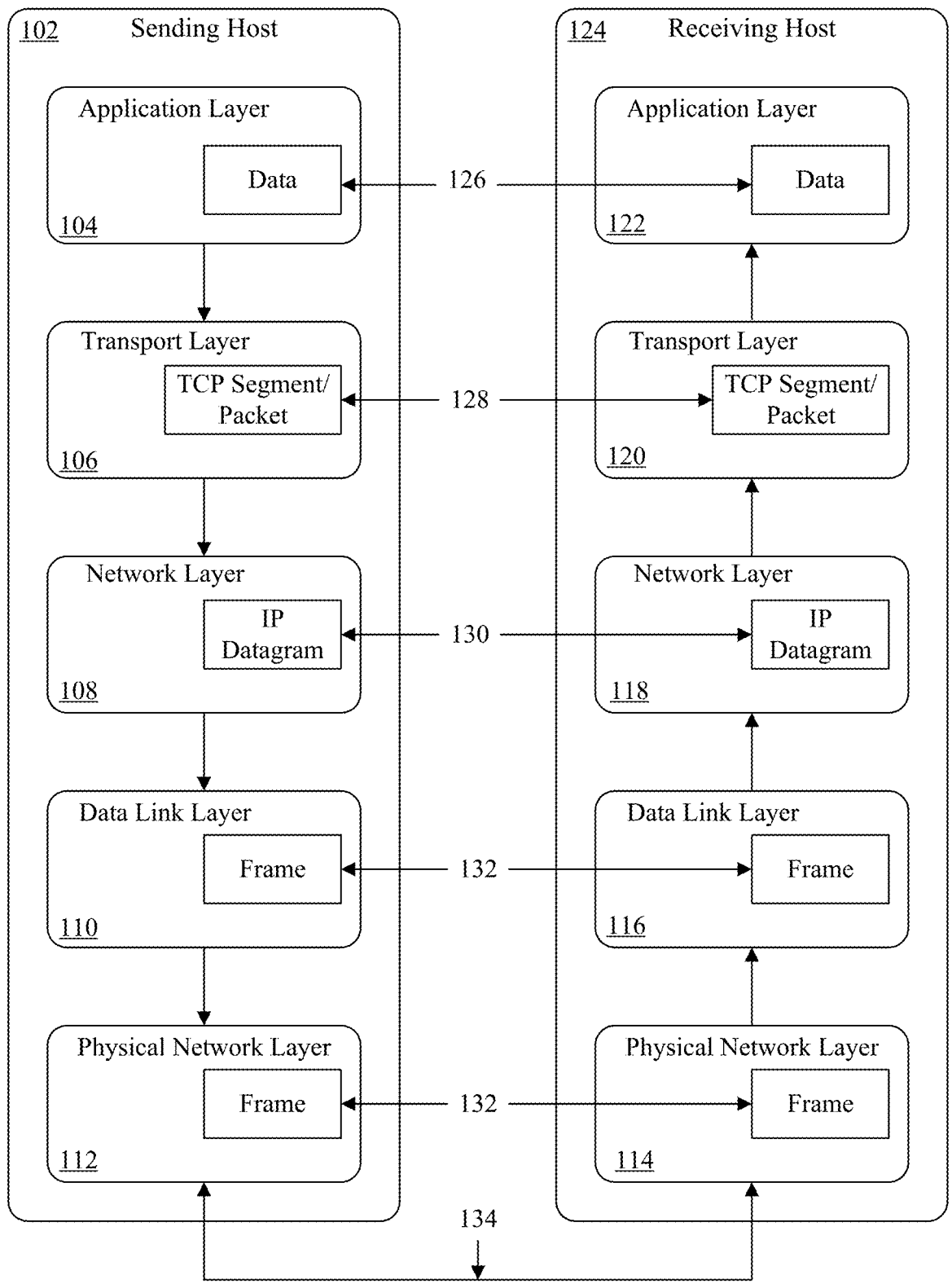
FIG. 1 depicts a conceptual model for the lifecycle of a data packet, or collection of data packets, traveling from one computer to another computer.

The disclosed embodiments relate to market protection systems to monitor and evaluate trading activity, detect undesired activity and appropriately react more quickly to mitigate the spread of the foregoing problems without impeding legitimate market operation.

A message protocol, also referred to as a communication protocol, generally specifies a set of rules and descriptions that detail how data should be structured, e.g. logically and/or physically, to allow for, or otherwise govern, transmission over a communications medium, across a network and/or between or within devices. Communication protocols exist that allow for the transmission of many different types of information and typically define or otherwise specify how the data should be structured, how to detect errors in the transmission of the data, the rate, or range thereof, of transmission for the data, how the data is transmitted, as well as other aspects of the mechanics of communication or combinations thereof.

To facilitate communication between computer systems, the communications protocols used thereby may be implemented according to the Open Systems Interconnection ("OSI") reference model. The OSI model conceptualizes a layered abstraction structure to handle the packaging and transmission of data between/across various network devices. The OSI model generally specifies seven different layers, each of which may also be referred to as an abstraction layer and the collection of layers may be referred to as a protocol stack, where each layer has or is characterized by a particular set of communication protocols which will work on that particular layer and allow for communication with the adjacent layers. It will be appreciated that the terms "layer" and "protocol stack" may also refer to the computer software programs/components which implement the various model layers. These layers include a physical layer, a data link layer, a network layer, a transport layer, a session layer, a presentation layer, and an application layer. It will be appreciated that the layered structure may be implementation dependent and that fewer or more layers may be defined, e.g. some layers may not be implemented, the functionality of multiple layers may be combined into a single layer or the functionality of a single layer may be further divided among additional/multiple layers.

According to the OSI model, the physical layer deals with the electrical, or optical, and physical requirements for devices engaged in data transmission. The data link layer is the protocol layer that transfers data between adjacent network nodes in a wide area network (WAN) or between nodes on the same local area network (LAN) segment and provides the functional and procedural means to transfer data between network entities. The network layer provides the functional and procedural means of transferring fixed or variable length data sequences from one node to another connected to the same network. The transport layer provides the functional and procedural means of transferring variable-length data sequences from a source to a destination host via one or more networks. The session layer controls the dialogues between computers by establishing, managing, and terminating the connections, i.e. sessions, between local and remote applications. The presentation layer establishes context between application-layer entities, in which the application-layer entities may use different syntax and semantics if the presentation service provides a mapping between them. The application layer is the OSI layer closest to the end user and interacts with software applications on a user computer, which means both the OSI application layer and the user may interact directly with a software application. Among other attributes, the OSI model, and accompanying protocols compliant therewith, facilitates both unreliable and reliable communication, i.e. protocols which may or may not include mechanisms that detect and notify a user or other component if the delivery of data fails.

An example protocol that is used to implement the transport layer of the OSI model is the Transmission Control Protocol (TCP). TCP is known as a reliable protocol and is used in conjunction with the Internet Protocol (IP), e.g. IPv4 or IPv6, a typical protocol used to implement the network layer. According to TCP, data transmitted between computers is organized into segments, which are often referred to as packets, each of which identify the source of the data being transmitted and the destinations thereof, as well as may include a data payload comprising the data being transmitted, or a portion thereof. Each packet includes a packet header and, optionally, a payload. TCP is considered a reliable protocol because it uses sequence numbers to identify each packet of data that is sent from one computer to another computer so that all of the packets may be accounted for, i.e. the sequence numbers assigned to each packet identify the offset within a stream of data for which a particular packet contains data such that lost data may be caused to be retransmitted. The sequence number identifies the order of packets sent from each computer so that the data can be reconstructed in order, regardless of any packet reordering, or packet loss, that may occur during transmission from device to device as the packets traverse the network infrastructure. TCP uses acknowledgements sent by the receiver of data to tell the sender of that data that the data has been received by the receiver. In the event of packet loss, TCP allows for implementers of the protocol to choose how packet loss is handled. In one implementation, the receiver of the packets who detects packet loss may request that the sender resend only the missing packet(s). In another implementation, the receiver of the packets who detects packet loss may request that the sender resend all of the packets including the missing packet(s) and packets already received from a particular demarcation point, e.g. sent since the opening of a connection or sent since a loss was detected. Additionally, TCP uses IP to effectuate the actual delivery of the data packets that are sent by each computer over a network. The combination of TCP/IP allows for transmission of data over a network, such as the internet, in a reliable manner.

An example of a network that uses TCP/IP to exchange data packets, or simply packets, between nodes on the network is a packet switched network. A packet switched network is a network that employs packet switching, a transmission process that involves breaking up a data message into multiple packets and transmitting each packet along the network from a source to a destination. The path that the packets take along the network may cover multiple different nodes on the network. The packets do not need to travel the same path from source to destination. For example, given a message consisting of packets 1, 2, 3, and 4 with a source node of A and a destination node of E for the message, packet 1 may travel from node A to node B to node E, whereas packet 2 may travel from node A to node C to node E, and so on. An example of a packet switched network is the Internet, or a Local Area Network (LAN.) Using TCP, as described herein, whether the packets traverse the same path from the sender to the receiver or not, and/or whether packets are delivered out of order due to inequities in the latency of different paths utilized, is irrelevant as the TCP protocol ensures delivery and facilitates reordering of the packets upon receipt into the order as transmitted.

The TCP protocol is a reliable protocol, meaning that the TCP protocol ensures the delivery of all packets. Part of how the TCP protocol ensures delivery of all packets is by using a three way handshake to establish a connection. The three way handshake involves a sending node sending a message to a receiving node that the sending node is ready to transmit data and wants to open a logical connection with the receiving node. The receiving node receives the request to open a connection and sends its own acknowledgement of the request. The sender and receiver then begin transmitting along the connection, each using an initial sequence number for their side of the connection. All information that is transmitted is broken up into segments, and each segment has a timer associated with it. If a sender does not receive acknowledgment that a segment has been received before the timer for that segment runs out, the sender resends the segment. On the receiving end, the receiver of the segments will reorder segments into the proper order if need be, because, for example, some segments timed out and had to be retransmitted out of order, or the segments were transmitted via different network paths having varying latency allowing some segments to overtake other segments to arrive first.

User Datagram Protocol (UDP) is another Transport Layer protocol, which is an alternative to TCP. UDP is not, as opposed to TCP, a reliable protocol. UDP is connectionless and makes a best effort for transmission. UDP does not use a handshake system between sender and receiver. UDP is typically used for systems where dropped packets are preferable to waiting for delayed packets, or segments of data.

A lower layer down from the Transport and Network Layers is the Data Link Layer which, as described above, defines the protocol to establish and terminate a connection/session between two physically connected devices. Ethernet is an example of a data link layer protocol that can work in conjunction with the protocols which implement the other OSI layers, such as the TCP/IP protocols used for the Transport and Network layers. Ethernet describes how networked devices can format data for transmission to other network devices on the same network. Ethernet organizes the data to be transmitted into packets, referred to as Ethernet Frames, each of which identify the Ethernet source of data and Ethernet destination for the data, as well as include a data payload carrying, depending upon the amount, all or a subset of the data to be transmitted. An Ethernet Frame comprises a source and destination address, where the source and destination addresses correspond to Media Access Control addresses (or MAC addresses) for nodes on the network. The data payload is where any other headers for other protocols may be located as well as any data that may ultimately be used by applications. A TCP packet, as described above, may be transmitted over an Ethernet compatible network using one or more Ethernet frames.

The Application Layer of the OSI Model is the layer of the OSI model closest to an end user and is where applications and end user processes are implemented that deal with the data transmitted from the bottom layers to the top layers. Some example protocols that handle data on the Application Layer are HTTP, SMTP, etc. World Wide Web browser programs are an example of an Application layer program. In the context of electronic financial markets, the FIX protocol is an Application layer protocol (as well as a session and presentation layer protocol) which may be used with financial systems and financial trading software applications. The FIX protocol comprises a specification for standardized and streamlined real-time exchange of information related to securities transactions and markets.

Financial instrument trading systems are one example of transaction processing systems that utilize message handling protocols such as TCP/IP and Ethernet, e.g. to receive orders from participants and communicate market data thereto. Generally, a financial instrument trading system, such as a futures exchange, referred to herein also as an "Exchange", such as the Chicago Mercantile Exchange Inc. (CME), provides a contract market where financial instruments, for example futures, options on futures and spread contracts, are traded among market participants, e.g. traders, brokers, etc. Financial instruments, and their corresponding components, are communicated through the CME network as a series of messages. Futures is a term used to designate all contracts for the purchase or sale of financial instruments or physical commodities for future delivery or cash settlement, and which are traded on a commodity futures exchange. A futures contract is a standardized legally binding agreement to buy (long) or sell (short) a commodity or financial instrument at a specified price at a predetermined future time. An option is the right, but not the obligation, to sell (put) or buy (call) the underlying instrument (for example, a futures contract) at a specified price within a specified time. The commodity or instrument to be delivered in fulfillment of the contract, or alternatively the commodity, instrument or reference for which the cash market price shall determine the final settlement price of the futures contract, is known as the contract's "underlying" reference, instrument or commodity, also referred to as the "underlier." The terms and conditions of each futures contract are standardized as to the specification of the contract's underlier, the quality and quantity of such underlier, delivery date, and means of contract settlement, i.e. physical delivery or cash settlement. Cash Settlement is a method of settling a futures contract whereby the parties effect final settlement when the contract expires by paying/receiving the pecuniary loss/gain of the contract, e.g. by comparing the contract price to the market price or other reference price of the underlier at the time of settlement, related to the contract in cash, rather than by effecting physical delivery, i.e. the actual exchange of the underlying reference or commodity at a price determined by the futures contract.

Typically, the Exchange provides for centralized "clearing" by which all trades are confirmed, and matched, and open positions are settled each day until expired (such as in the case of an option), offset or delivered. The clearing function includes messaging among participants in the market. Matching, which is a function typically performed by the Exchange, is a process, for a given order which specifies a desire to buy or sell a quantity of a particular instrument at a particular price, of seeking/identifying one or more wholly or partially, with respect to quantity, satisfying counter orders thereto, e.g. a sell counter to an order to buy, or vice versa, for the same instrument at the same, or sometimes better, price (but not necessarily the same quantity), which are then paired for execution to complete a trade between the respective market participants (via the Exchange) and at least partially satisfy the desired quantity of one or both of the order and/or the counter order, with any residual unsatisfied quantity left to await another suitable counter order, referred to as "resting."

A "Clearing House," which is typically an adjunct to the Exchange and may be an operating division thereof, is responsible for settling trading accounts, clearing trades, collecting and maintaining performance bond funds, regulating delivery, and reporting trading data to market regulators and to the market participants. An essential role of the clearing house is to mitigate credit risk via the clearing process. Clearing is the procedure through which the Clearing House becomes buyer to each seller of a futures contract, and seller to each buyer, also referred to as a "novation," and assumes responsibility for protecting buyers and sellers from financial loss due to breach of contract, by assuring performance on each contract. A clearing member is a firm qualified to clear trades through the Clearing House.

Current financial instrument trading systems allow traders to submit orders and receive confirmations, market data, and other information electronically via a communications network. These "electronic" marketplaces, implemented by, and also referred to as, "electronic trading systems," are an alternative trading forum to pit based trading systems whereby the traders, or their representatives, all physically stand in a designated location, i.e. a trading pit, and trade with each other via oral and visual/hand based communication.

In particular, electronic trading of financial instruments, such as futures contracts, is conducted by market participants sending orders, such as to buy or sell one or more futures contracts, in electronic form to the Exchange, e.g. using electronic messages comprising the orders. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and generally made visible, i.e., their availability for trading may be advertised, to the market participants through electronic messages, e.g., notifications/broadcasts, referred to as market data feeds. An order book is typically maintained for each product, e.g. instrument, traded on the electronic trading system and generally defines or otherwise represents the state of the market for that product, i.e. the current prices at which the market participants are willing to buy or sell that product as well as the quantities thereof. As such, as used herein, an order book for a product may also be referred to as a market for that product.

A market data feed, also referred to as market data or a market feed, is a compressed or uncompressed real time (with respect to market events), or substantial approximation thereof, data/message stream, i.e. sequence or series of electronic messages, provided by the Exchange directly, or via a third party intermediary. A market data feed may be comprised of individual electronic messages, each comprising one or more packets or datagrams, and may carry, for example, pricing or other information regarding orders placed, traded instruments and other market information, such as summary values and statistical values, or combinations thereof, and may be transmitted, e.g. multi-casted, to the market participants using standardized protocols, such as TCP or UDP over Ethernet. The electronic messages of the market data feed, comprising data relating to an event, may be generated and transmitted responsive to the occurrence of that event, i.e. in real time with respect thereto, or generated and/or transmitted at a later time subsequent to the event and may comprise only the data related to the event or include additional data. More than one market data feed, each, for example, carrying different information, may be provided. Standard protocols that may be utilized for the communication of orders and/or transmission of market data feeds is the Financial Information Exchange (FIX) protocol, and the Financial Information Exchange Adapted for Streaming (FAST), aka FIX/FAST, which is used by multiple exchanges to distribute their market data. Other protocols, standard or proprietary, may also be used for order communication and/or market data feeds in addition to or in lieu of FIX or FIX/FAST, such as Simple Binary Encoding, ITCH/OUCH, iLink 3, etc. Pricing information conveyed by the market data feed may include the prices, or changes thereto, of resting orders, prices at which particular orders were recently traded, or other information representative of the state of the market or changes therein. Separate, directed/private, messages may also be transmitted, in real time or otherwise, directly to market participants to confirm receipt of orders, cancellation of orders and otherwise provide acknowledgment or notification of matching and other events relevant, or otherwise privy, only to the particular market participant.

As may be perceived/experienced by the market participants from outside the Exchange or electronic trading system operated thereby, the following sequence describes how, at least in part, information may be propagated in such a system, through a series of electronic messages, and how orders may be processed:

(1) An opportunity is created at a matching engine of the Exchange, such as by placing a recently received but unmatched order on the order book to rest indicating a trader willing to trade a particular quantity at a particular price, i.e. an opportunity for another trader to trade therewith;

(2) The matching engine creates an update reflecting the opportunity and sends it to a feed engine;

(3) The feed engine transmits, e.g. using multicasting, or multiple unicast streams, or other mode of broadcasting, the update in a message sent to all of the market participants to advertise the opportunity to trade, i.e. transmits a broadcast market data feed message;

(4) The market participants evaluate the opportunity and each, upon completion of their evaluation, may or may not choose to respond with an order, i.e., a message containing their counter-order, responsive to the resting order, i.e., counter to the resting order for some or all of the available quantity;

(5) The Exchange gateway, i.e., a market segment gateway (MSGW), receives any counter orders generated by the market participants, ascribes an ordering to each received order relative to the other received orders, sends confirmation of receipt back directly to each submitting market participant, and forwards the received orders to the matching engine; and (6) The matching engine evaluates the received orders and matches, using for example, a price/time priority algorithm, the first suitable arriving order, based on the ascribed ordering, against the resting opportunity and a trade is executed. Depending upon the available quantity of the resting order and the quantity of the incoming order, one of the resting order or the incoming order may be fully satisfied with any remainder of either order being placed on the order book to rest, or cancelled, etc.

To attract and retain market participants and encourage participation, electronic trading systems ideally attempt to offer a more efficient, fair and balanced market where market prices reflect a true consensus of the value of traded products among the market participants, and which minimize, if not eliminate, surreptitious or overt subversion, influence of, or manipulation by, any one or more market participants or other entities, intentional or otherwise, and unfair or inequitable advantages, with respect to access to information or opportunities. To accomplish these goals, for example, electronic trading systems may operate in a deterministic, i.e. a causal, predictable, or otherwise expected, manner, as understood and experienced by the market participants, i.e. the customers of the Exchange.

Accordingly, the operators of electronic trading systems, alone or in conjunction with, or at the direction of, regulatory or industry organizations, typically publish or otherwise promulgate rules or regulations, referred to as business or operating rules, as well as specify protocols for interaction therewith, which govern or otherwise specify the operation of the system. These rules define how, for example, multiple transactions are processed by the system where those transactions have relationships or dependencies there between which may affect the result of such processing. Such business rules may include, for example, order allocation rules, i.e. rules which dictate which of multiple competing resting orders will be matched with a particular incoming order counter thereto having insufficient quantity to fill all of the suitable resting orders. For example, under a first-in-first-out methodology, the first order, of the competing resting orders at the same price, that was received by the electronic trading system will be matched with the incoming counter-order and filled to the extent possible by the available quantity, with any residual quantity of the incoming counter order then being allocated to the next received suitable competing resting order and so on until the available quantity of the incoming counter order is exhausted. However, additional or alternative matching/allocation rules may be implemented as well, for example to ensure fair and equal access, improve trading opportunities, etc., by allocating, such as proportionally, the available quantity of the incoming counter order among all, or a subset, of the competing resting orders until the available quantity is exhausted.

These business rules may further include specifications of messaging protocols, as described above, used by the electronic trading system for communication with market participants. In particular, these rules may specify which protocols are being used and how they are implemented so that market participants not only understand how to communicate with the exchange, i.e. how to properly format and transmit orders, but also understand how and when the electronic trading system will respond to their messages as well as process their messages with respect to messages received from other market participants, e.g. such as when messages comprising competing orders are received substantially simultaneously. While the electronic trading system typically may not dictate, specify or control how market participants implement their trading or communications systems, the electronic trading system's own implementation of messaging protocols often defacto-dictates broadly, if not specifically, how a market participant must implement their own messaging protocols in order to successfully interact therewith.

Once such business rules are established, or modified, market participants will expect, and overseeing regulatory entities may require, that the electronic trading system operate in accordance therewith. That is, if the Exchange adopts a rule to give first arriving orders priority over later arriving orders, a market participant who submits an earlier arriving order will expect their order to be filled prior to a later arriving order submitted by another market participant. It will be appreciated that these rules, by which operators of an electronic trading system may choose to operate their system, may vary at the discretion of the operators, subject to regulatory concerns. Generally, the term "transactional determinism" may refer to the processing, or the appearance thereof, of orders in accordance with the defined business rules.

In addition to efficiency, fairness and equity, electronic trading systems further provide significant performance improvements allowing for rapid high volume transaction processing which benefits both the Exchange and market participants. Metrics of electronic trading system performance include latency and throughput. Latency may be measured as the response time of the Exchange. This can be measured in a number of different contexts: the time elapsed from when an order, or order cancelation, is received to when a confirmation/acknowledgment of receipt is transmitted, from when an order is received to when an execution notification is transmitted, or the time elapsed from when an order is received to information about that order being disseminated in the market data feed, or combinations thereof, which may be referred to as the tick-to-trade latency. Throughput may be measured as the maximum number of orders or trades per second that the electronic trading system can support, i.e., receive and acknowledge, receive and match, etc.

Generally, market participants desire timely and deterministic market data updates, low latency/high throughput order processing, and prompt confirmations of their instructions to allow them to: competitively, frequently and confidently evaluate, and react to, or, conversely avoid, discrete, finite, fast moving/changing or ephemeral market events; and/or otherwise coordinate, or synchronize their trading activities with other related business concerns or activities, with less uncertainty with respect to their order status. Higher volume capacity and transaction processing performance provides these benefits as well as, without detrimentally affecting that capacity or performance: further improves market access and market liquidity, such as by allowing for participation by more market participants; the provision of additional financial products, and/or additional markets therefore, to meet the varying needs of the market participants; and efficient identification of additional explicit and implicit intra- and inter-market trading opportunities. The Exchange benefits, for example, from the increased transaction volume from which revenue is derived, e.g., via transaction fees.

Current electronic trading systems already offer significant performance advantages. However, increasing transaction volumes from an increasing number of market participants, implementation by some market participants of algorithmic and/or electronic liquidity provisioning methodologies whereby high speed computers automatically monitor markets and react, with deterministic efficiency, i.e., minimal latency, to events, coupled with a continued demand for ever-decreasing processing latencies and response times, is driving a need for additional capacity and performance improvements to maintain performance as experienced by each market participant and avoid detrimental consequences, such as capacity exhaustion and inequitable access. For example, the increasing efficiency with which market participants may evaluate and respond to changes in market data, such as responsive to a market event, is increasing the rate at which transactions are received by the electronic trading system, narrowing the delay of receipt gap there between and necessitating a need for a higher degree of discrimination so as to resolve the order/sequence in which those transactions are received, upon which the deterministic operation of the electronic trading system may be based, e.g., for order priority, allocation, etc. Furthermore, the addition, by electronic trading systems, of additional communication bandwidth, in an effort to equitably increase capacity and opportunity, allows for more transactions to be submitted over multiple parallel paths into the system which may then all converge at a common point of determinism. Accordingly, not only must the electronic trading system discriminate among closely received incoming transactions, but must further arbitrate among a congestion of transactions received simultaneously, or temporally so close together as to be considered simultaneously received, i.e., the difference in their time of receipt being too close to measure by the implemented discrimination mechanisms, also referred to as "substantially simultaneously".

In addition to increased capacity and lower latency, the global nature of business has further driven a need for fault tolerance to increase availability and reliability of electronic trading systems. Scheduled outages must be minimized, and unscheduled outages must be eliminated.

Furthermore, to implement the Exchange's clearing function, which mitigates the concerns of market participants relating to performance by counter parties, protects the interests of the Exchange and otherwise adequately manages/mitigates risk, risk management systems having corresponding operational efficiency and performance are needed so as to protect the Exchange from loss while minimizing impediments to market operations or distractions to market participants with ancillary and unnecessary tasks. In addition, increased transaction volume may further translate into greater exposure for market participants requiring greater amounts of capital to be posted to cover losses.

Without additional safeguards, improved speed and efficiency may, in some circumstances, improve the speed at which problems may occur, grow and propagate, or otherwise may be exploited, such as where the market ceases to operate as intended, i.e., the market may no longer reflect a true consensus of the value of traded products among the market participants. Such problems are typically, but not always, evidenced by extreme market activity such as large changes in price, whether up or down, over a short period of time or an extreme volume of trades taking place.

For example, while electronic trading system provide equitable access and operation for all participants, and communications technologies may have improved, imbalances external to and outside the control of the electronic trading system may still exist in both access to information and access to opportunities to participate, which may not be due to any violations of legislative, regulatory and/or ethical rules, e.g., some traders receive information before other traders because they have access to, such as due to physical location, or otherwise can afford faster communications channels, some traders may be able to place trade orders more quickly than others because they have faster computers, etc. In many cases, certain trader behaviors may be triggered by a market event, such as a change in price, creating a feedback loop where an initial reaction may then cause further market events, such as continued price drops, triggering further responses and resulting in an extreme change in the price of the traded product in a short period of time. High speed trading may exacerbate the problem as there may be little time for traders/algorithmic trading systems, or those overseeing them, to contemplate and temper their reactions before significant losses may be incurred. Furthermore, improved communications among traders facilitates a continuous stream of information and propagation of behavior, efficiency seeking or not, in one market to other markets as traders in those other markets react to the results of that behavior.

In particular, current communication technology may cause several problems related to latency in the electronic trading systems. For example, when two or more market participants compete for the same trading opportunity in the electronic trading system, the first participant to reach the point of matching priority determination wins. Because of that, many market participants compete with each other on latency. Some latency sensitive customers, such as high frequency traders (HFTs), leverage various techniques to try to gain microsecond-level speed improvements.

However, some of these techniques may result in an increased operational risk for the Exchange trading infrastructure such as the MSGW. Two such techniques to try to gain microsecond level speed improvements, as were discussed above, may be delayed messaging and transmission control protocol (TCP) retransmissions.

For example, in general, as mentioned above, data communications involve at least three agents: computers, networks, and applications, i.e., trading applications used by market participants. These applications execute on computers that typically support multiple simultaneous applications. Computers are connected to networks and the data to be exchanged is transferred by the network from one computer to another. Thus, the transfer of data to the computer involves first getting the data to the computer in which the application resides and then getting it to the intended application within the computer. For successful communication, each entity in the overall system must have a unique address. For example, each computer on the network must have a unique address; this allows the network to deliver data to the proper computer. Further, each application on a computer has an address that is unique within that computer; this allows the transport layer (TCP) to support multiple applications at each computer. These latter addresses are known as service access points (SAPs), or ports, connoting the fact that each application is individually accessing the services of the transport layer (TCP).

In an example, as was described above, a first participant, i.e., a market participant, may request that an application associated with a first port at a first computer to send a data message to another application, associated with a second port at a second computer, i.e., an Exchange computer. The application at the first computer hands the message over to its transport layer (TCP) with instructions to send it to the second computer. To control this operation, control information, as well as user data must be transmitted. The sending process generates a block of data containing the message(s) to be transmitted and passes this to TCP. TCP may break this block of data into smaller pieces to make it more manageable. To each of these pieces, TCP appends control information known as a TCP header forming a TCP segment. For example, items in this header may include but are not limited to a source port, a destination port, a sequence number, and a checksum. The header format for TCP has a minimum length of 20 octets or 160 bits. The source port is a 16 bits field and identifies the application at the source computer. The destination port is a 16 bits field and identifies the application at the destination computer. The checksum is a 16-bit frame check sequence used to detect errors in the TCP segment. The sequence number is a 32 bits field and provides flow control and error control. Using the sequence number field, TCP numbers the segments that it sends to the particular destination port sequentially, so that if they arrive out of order, the TCP entity at the second computer can reorder them in the order in which the originating TCP received them from the application.

Delayed messaging, as was described above, may occur with some transmission protocols between a sender and a receiver when the sender intentionally holds back a portion, e.g., an event dependent portion, of the electronic message while sending the other portions of the electronic message. In delayed messaging, a sender wishing to send a message via TCP but wishing to hold back an event dependent portion of the message, provides only part of the message to TCP, holding back the event dependent portion which may be from any part of the overall message. TCP, unaware that it has not received the entire message, then processes and sends the partial message as it normally would, using one or more packets sent in sequence. The sender, upon the occurrence of the event, then provides the remaining portion of the message to TCP for transmission which TCP then places in one or more packets, in sequence with the prior sent packets, and sends it/them off. At the receiver, the packets are received in sequence, albeit with a delay between the second to last and the last to be received packet(s). When all of the packets are received and the message is reassembled in the packet sequence, the entire message is present and complete but the held back portion will be placed at the end of the message which may not be in the order of the original message. If the order of the parts of the message is not important or required by the application, then this will have no effect. For example, the sender may choose to send most of the electronic trading message using the FIX protocol to the MSGW but withholds portions of the electronic trading message that include fields such as price and quantity until such time as a market driven event encourages them to complete their trade. After the market driven event occurs, the market participant may decide whether the electronic trading message is desired. If the market participant decides that the electronic trading message is desired, using the delayed messaging technique, the market participant need only send the remaining portions of the electronic trading message that include the omitted fields which meet up with the previously transmitted portions which are already buffered at the receiver. As FIX places no requirements on the order in which the message data fields are sent or received, the complete message, with the critical fields appearing at the end, will be processed by the trading system. Accordingly, a market participant is able to maximize the amount of time they have to make critical event dependent decisions. Further, the remaining portions of the message are necessarily smaller than a complete message and thus they take less time to send. Therefore, the trade is received and matched quicker than other market participants that send their complete trade message only after the occurrence of the event. On the other hand, after the market driven event occurs, if the market participant decides that the electronic trading message is no longer desired, the market participant may not send the packets including the omitted fields, or instead send corrupted portions, thereby canceling the undesired electronic trading message.

In TCP retransmissions, the sender provides all or some of their message to TCP but manipulates the TCP to hold back one or more packets, which in the packet sequence would contain that portion of the message that the sender wishes to delay. As opposed to delayed messaging, TCP will then send the remaining packets in sequence with a gap where the held message would have been sent. The receiver sees the packets arrive, buffers those packets and detects the missing packet(s). The receiver's TCP may then issue a retransmission request. While waiting, the receiver keeps the received packets in its buffer awaiting the missing packet(s). When the missing packet(s) is/are received, the receiver assembles the message based on the packet sequence with the message therefore being reassembled in the original order, as opposed to out of order as with delayed messaging. TCP retransmissions can be used on a single message divided among multiple packets or multiple messages divided among multiple packets in the transmitted sequence, e.g., one message per packet, as the receiver will buffer all of the packets of a given sequence of packets until the missing packet(s) is/are received. For example, when using the TCP retransmission technique, some market participants may send part of the message, for example, packets 1 and 3-10 but omit packet 2 until a market driven event occurs that warrants the completion of the message. Packet 2, for example, may contain the price field for the trade order. When the market driven event occurs and the market participant determines that the message is desired and the market participant knows what data he/she wishes to send, e.g., what price, the TCP retransmission technique allows the market participant to generate and/or send the omitted packet 2 at that time. When the market driven event occurs and the market participant determines that the message is no longer desired, the market participant may cancel the message by failing to send the remaining packets or by invalidating the message by sending corrupt packets. The TCP retransmission technique is more complicated and expensive to implement than the delayed messaging technique since it requires a change in the low level TCP protocol to allow for a gap in the packet transmission sequencing on the sender's computer whereas delayed messaging merely requires the sender to hold back the delayed information from their TCP.

With prior trade messaging protocols, e.g., the FIX protocol, the delayed messaging technique allowed a trader to hold back critical portions of a message, e.g., the price field, and send that portion only once critical information was learned. The FIX protocol does not enforce a particular order in which portions of a FIX message must be received so the price field coming at the end of the message would have no effect on the processing of the trade order. Generally, the use of delayed messaging could be detected as typical trade messages do not require more than one packet to send. Therefore, if a trade message is received across multiple packets, it may be assumed that the sender is using delayed messaging.

Newer trade messaging protocols, such as iLink 3, use a binary format which enforces a strict ordering on the fields within the message. If the message fields are received out of order, the message will be rejected. Accordingly, delayed messaging may not be used with such protocols as the sender can no longer hold back particular fields of information from being sent if those fields will be sent out of order. Further, these newer protocols intentionally require critical data fields to appear first in a trade message negating any benefit of using delayed messaging even with ordered transmission.

However, the TCP retransmission technique may still be used with these newer protocols as, with TCP retransmissions, the message, upon receipt of all packets, will be reassembled, despite the delay in receiving some packet(s), by the receiver in the correct order based on the packet sequencing. Further, the TCP retransmission technique can be used by a sender to front load multiple trade orders, each taking one or more packets, by sending all of the packets for those orders but for one or more packets being held back. The receiver will buffer all of the received packets until the missing packet(s) is/are received, essentially allowing the sender to front load their data transfer, or otherwise establish priority in the receiving buffer, prior to a critical event and then send the missing packet(s) to complete the one or more messages. Again, this allows a trader to maximize the window over which they can capitalize on critical information, reduces the effective latency of transmitting their trade orders relative to such information, allows them to establish priority as compared to other traders with respect to such information, and may allow them to consume processing resources at the Exchange thereby limiting or denying access to others. The disclosed embodiments, however, detect such manipulation by detecting the out of order delivery of the packets as described.

The complex nature of these techniques means they can easily be implemented and executed incorrectly. There can be a risk to the Exchange trading infrastructure if a customer attempts either of these techniques incorrectly and, for example, floods the input, e.g., the MSGW, with malformed packets, effectively causing a denial of service for legitimate messages.

The disclosed embodiments detect when TCP packets are received out of order by the system, due to TCP retransmission, and adds a time delay to the message comprised by those packets to eliminate a possible latency advantage. The disclosed systems and methods deter customers from attempting to delay the completion of their messages or otherwise manipulate the order of packet receipt.

In particular, in one embodiment, a network interface receives a plurality of packets of an electronic data message from one of one or more sources. Each packet contains a sequence number field that keeps track of which packets forming the electronic data message are expected and in what order those packets should be arranged to re-form the electronic data message. When each packet is received by the network interface, the network interface assigns a timestamp to that received packet indicating its time of receipt. In other words, the network interface augments each received packet with a timestamp upon receipt indicative of the time thereof. The network interface forwards each packet to the MSGW, e.g., as each packet is received. When a message is complete, the MSGW analyzes each of the received augmented packets to determine if at least one of the packets arrived in a different order from the sequence by comparing the sequence number with the corresponding timestamp of each packet to determine if the order of the timestamps corresponds to the sequence. If the timestamps are not in the same sequence as the packets, i.e., a later packet in the sequence of packets has a timestamp indicating that it was received prior to an earlier packet in the sequence, the MSGW may conclude that the message was delayed. In the example of the TCP retransmission above, if packets with sequence numbers 1 and 3-10 are received first and 2 is received afterwards, sequence number 2 will have a later timestamp than that of sequence numbers 3-10 and thus it may be assumed that the sender intentionally delayed packet 2. In this case, the disclosed system may take an action such as by adding additional delay to the data message prior to forwarding it for further processing, which as will be described, may cause the data message to be processed after a later received data message when it otherwise would have been processed before.

While the disclosed detection and deterrent mechanism may affect both customers who are actively executing these techniques as well as customers whose packets are inadvertently and unintentionally delayed, such as due to a problem with the network that results in the non-intentional sending or reception of split/out of order messages or retransmissions, the non-discriminatory application of the disclosed embodiments may be considered acceptable. In particular, it may be assumed that the actions of the disclosed embodiments do not pose a problem to customers who are unaware that their messages are being affected as, based on their lack of awareness, they may be considered not to be latency sensitive. If a customer is aware of the manner in which their packets are being transmitted or of the actions of the disclosed embodiments, then the manner in which their packets are being transmitted may be deemed as intentional. In particular, a latency sensitive customer aware that their data packets are encountering transmission problems which cause the disclosed embodiments to act may be assumed to be incentivized to take appropriate action to rectify such unintentional transmission problems, mitigating the application of the disclosed embodiments.

Generally, the disclosed embodiments recognize that, while the TCP protocol was developed with mechanisms to ensure reliable delivery of missing or out of order packets as such events were assumed to regularly occur over networks as they existed at the time of the development of the TCP protocol, modern computer networks are more robust and the occurrence of missing packets or out of order delivery due to, for example, unintentional network issues, is less likely to occur.

The disclosed embodiments provide a technical process of analyzing a data message to determine the timing of transmission of portions thereof over a network. The disclosed systems and methods recognize that data messages sent over a network are not sent as a single unit which arrives at the destination as such. Instead, data messages are sent as one or more streams or packets of serially communicated signals, e.g. 1's and 0's. Accordingly, these signals do not arrive at the destination all at once but are instead received over one or more continuous or discontinuous periods of time. The communications protocols which manage the transmission of such data messages are designed to handle the mechanics of the data transmission process to ensure that data messages are properly communicated.

However, as stated above, communications protocols such as TCP also enable a source of a data message to manipulate the transmission of the data message to delay transmission of a portion thereof, particularly when that portion includes data dependent upon a yet to occur event, capitalizing on the inherent reliability mechanisms of the TCP protocol.

The disclosed embodiments relate to a practical application of processing "electronic data messages" transmitted over a computer network to determine when portions of that data message were transmitted and received.

The disclosed embodiments relate to an implementation, such as by a message processing system architecture, of a message handling system and/or protocol which mitigates optimistic messaging behavior. As used herein optimistic messaging behavior may at least refer to the transmission, in whole or in part, of an electronic data message, or of one or more electronic data messages of a sequence thereof, to a receiving system, such as the system implemented by the disclosed embodiments, prior to the sender determining that the message(s) is/are desired, alone, e.g., to gain a priority advantage over electronic data messages sent from other senders, or in conjunction with subsequently canceling or otherwise invalidating the electronic data message(s) once it has been determined that it is not desired. The disclosed embodiments mitigate such behavior by detecting and taking action with respect to these types of electronic data messages to deter such optimizing behavior, which may or may not be manipulative, while maintaining reliable message handling under increasing processing loads with minimal impact on users being able to send electronic data messages to the system.

The disclosed embodiments relate to a specific and practical application which improves upon the ability to mitigate manipulation of the timing of transmission of electronic data messages over a network.

The disclosed technology addresses the need in the art for mitigating optimistic messaging which is unique to electronic communications systems which decompose messages into transmissible portions or otherwise transmit messages in sequence and use protocols to ensure reliable, complete and/or error-free transmission thereof, as opposed to prior trading systems which relied upon traders communicating face to face or via telephone where messages were communicated there between in their entirety. Specifically, the disclosed technology solves a problem that uniquely arises in the fields of computer technology, electronic communications networks and exchange computing systems, where data transmission and communications protocols may be managed or optimized to alter or otherwise control message ordering and/or delivery, in particular with respect to messages communicated to same destination from other sources. Thus, the disclosed solution is rooted in computer technology in order to overcome a problem specifically arising in the computer systems and electronic communications networks used by such electronic trading systems. Indeed, the subject technology improves the functioning of the computer by, for example, detecting possible message optimization, allowing the computer to use fewer resources and deterring technical manipulations or optimization implementation modifications which, when defectively implemented, may impact system performance and/or availability.

The disclosed embodiments recite an improvement over the traditional network communications systems which do not determine when each packet of data messages is received, or are otherwise unconcerned with the order of packet arrival, and thereby, may be subject to performance degradation and other problems due to manipulation of the data message transmission. In particular, standard TCP/IP is meant to provide error-free data transmission by handling retransmission of dropped or garbled packets and acknowledges that all packets arrive. In fact, TCP was designed to inherently deal with out of order packets as, at the time that TCP was developed, out of order and lost packets were likely to happen over a packet switched network having multiple routes from a source to destination. In other words, TCP was designed to handle retransmissions to implement reliability in the network given the technical limitations of computer networks at that time. TCP is designed to break up messages into separately transmitted packets and it anticipates that out of order delivery may take place. Therefore, standard TCP/IP based applications are not concerned about packet order. Most application are still based on the premise of a layered/abstracted implementation where out of order delivery is of no concern and TCP still handles the problem should it occur. However, today, given the reliability of modern networks, out of order delivery is actually extremely unlikely. The disclosed embodiments recognize that out of order delivery is more likely to be a problem unrelated to network reliability and, irrespective of TCP's functionality, are therefore specifically implemented to detect and mitigate out of order delivery. Therefore, the disclosed embodiments provide an unconventional implementation.

Other systems have been developed to address the foregoing problems, see U.S. patent application Ser. No. 15/851,067, filed on Dec. 21, 2017, published as U.S. Patent Publication No. US 2018-0183901 A1, entitled "Message Processing Protocol which Mitigates Optimistic Messaging Behavior", the entirety of which is incorporated by reference herein and relied upon. In contrast with the disclosed embodiments, these other systems relate to, as evidence of optimistic messaging behavior, determining, relative to an event, when portions of the data message were transmitted so as to determine if an event dependent portion was sent after the event occurrence while the event independent portions were sent prior thereto. The disclosed embodiments, in contrast, look at the portions of the data message alone based on when they were received relative to their message sequence, regardless of whether portions were sent prior to or after occurrence of an event.

That is, the disclosed embodiments do not rely on an occurrence of an event to determine whether the source is manipulating the timing of the transmission. Instead, the disclosed embodiments provide a much simpler mechanism by analyzing the electronic data message to determine if, using timestamps accorded to each packet upon receipt, at least one of the packets arrived in an order different from the sequence by comparing the data indicative of the sequence with the corresponding timestamp of each packet to determine if the order of the timestamps corresponds to the sequence. The disclosed embodiments take an action when the message processor determines that at least one of the packets of the electronic data message arrived in an order different from the sequence. The disclosed embodiments do not distinguish inadvertent from intentionally optimistic or otherwise optimized user behavior. Therefore, the action is taken regardless of whether the source is manipulating the timing of the transmission of the electronic data messages or whether the source is experiencing problems beyond its control such as accidental communication issues.

The disclosed embodiments are drawn to systems and methods that include specific computing components; each being specially programmed to perform a technological function as part of a greater technological process. The disclosed embodiments include separate system components interconnected in a specific way to implement aspects of the disclosed system and include sufficient specific structure and function and, as such, are not drawn to an abstract idea.

The disclosed embodiments are not directed to any method for "obtaining, transforming and determining," which is involved in all computing functionality. The disclosed embodiments and features recited in this regard provide numerous advantages. The instant embodiments do not preempt all methods of "obtaining, transforming, and determining," and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

The disclosed messaging system architecture, as will be described, may be implemented using computer technology, e.g. processors, memories, electronic communications networks, inter or intra device, e.g. node, communications, and the like. As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" will refer to data processing functionality that is deployed on a GPP. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"—somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

Messages handled by the disclosed architecture may be related to business transactions which, themselves, may be defined as one or more operations or acts which are undertaken according to one or more associated business rules (including industry, legal or regulatory requirements or customs) to accomplish a business or commercial purpose, which may include compliance with industry, regulatory or legal requirements. A business transaction may be implemented by one or more computer processing and/or database operations/program steps, which themselves may be referred to as transactions. Business transactions, as defined by the associated business rules, may be characterized as deterministic in that they may be characterized by an interdependency or relationship which affects their result, such as a dependency on the order in which they are processed, such as a temporal order, and/or a dependency on real time processing, as defined by the business rules, so as to effect the business/commercial purpose and/or meet participant expectations, referred to herein as "transactional determinism." Generally, a set of deterministic transactions may provide a particular result when executed in one order and a different result when executed in a different order. In some applications, deterministic processing may be preferred/prioritized over real time processing. For more detail on deterministic operation in a trading system, see U.S. patent application Ser. No. 14/074,675, filed on Nov. 7, 2013, published as U.S. Patent Publication No. 2015/0127516, entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

For example, wherein the business rules define a first-in-first-out ("FIFO") process for matching offers with counter-offers to effect an exchange or trade, when an offer transaction is received to which no prior counter offer transaction has been previously received, it should be matched with the next suitable counter-offer transaction received rather than a later received counter-offer transaction. It will be appreciated that the processing of a given transaction may involve delaying further processing of that transaction in favor of a later received transaction, such as dependent upon conditions specified by the earlier transaction and/or the defined business rules. It will further be appreciated that, at a minimum, any representation of the current state of a business environment, e.g., market, or changes thereto, in which the business transactions are transacted should present an accurate reflection of the actual state or state change in accordance with the defined business rules. In the disclosed embodiments, the phrase "financial transaction" will refer to a business transaction involving the purchase or sale of financial instruments, such as futures contracts or options thereon, spread or other combination contracts and the like, as will be described. As was described above, electronic trading systems generally define their business rules and then must ensure transactional determinism in compliance therewith.

Alternatively, as will be described, the embodiments described below may be implemented using FPGA's or other reconfigurable logic. Implementing processing tasks and algorithms using an FPGA can yield significant performance enhancements over implementations using traditional microprocessors and operating systems. In particular, an FPGA based system implementation may avoid the processing overhead and uncontrollable/unnecessary optimizations implemented by general purpose processors, compilers, operating systems and communications protocols, as well as the security vulnerabilities thereof. For example, an FPGA may avoid interrupt handling, error correction, pre-fetching and other unnecessary microprocessor operations/optimizations, as well as generic processing/housekeeping tasks of the operating system which are not needed, such as garbage collection, unnecessary memory swaps, cache loads, task switching, cycle stealing, etc. Further an FPGA implementation may avoid the use of general purpose compilers which may introduce, for example, undesired program code optimizations.

For example, using an FPGA based implementation may permit components of a trading system to be collocated, such as via a custom interface, or otherwise closely interconnected with networking equipment, such as a router or switch, e.g. via a backplane thereof. This would allow the trading system to have access to incoming transactions as quickly as possible and avoid the latency introduced, not only by having to route the transaction over conventional networking media, but also by the communications protocols, e.g., TCP, used to perform that routing. One exemplary implementation is referred to as a "Smart Network Interface Controller" or "SmartNIC" which is a device which typically brings together high-speed network interfaces, a PCIe host interface, memory and an FPGA. The FPGA implements the NIC controller, acting as the bridge between the host computer and the network at the "physical layer" and allows user-designed custom processing logic to be integrated directly into the data path. This may allow a smart NIC to function as a programmable trading platform under the supervision of a host CPU. Under the OSI model, which, as described above, is a conceptual model that characterizes and standardizes the internal functions of a communication system by partitioning it into abstraction layers, the physical abstraction layer defines electrical and physical specifications for devices. In particular, it defines the relationship between a device and a transmission medium, such as a copper or fiber optical cable. This includes the layout of pins, voltages, line impedance, cable specifications, signal timing, hubs, repeaters, network adapters, host bus adapters (HBA used in storage area networks) and more. The major functions and services performed by the physical layer include: establishment and termination of a connection to a communications medium; participation in the process whereby the communication resources are effectively shared among multiple users, for example, contention resolution and flow control; and modulation or conversion between the representation of digital data in user equipment and the corresponding signals transmitted over a communications channel, these signals operating over the physical cabling (such as copper and optical fiber) or over a radio link.

Figure 2:
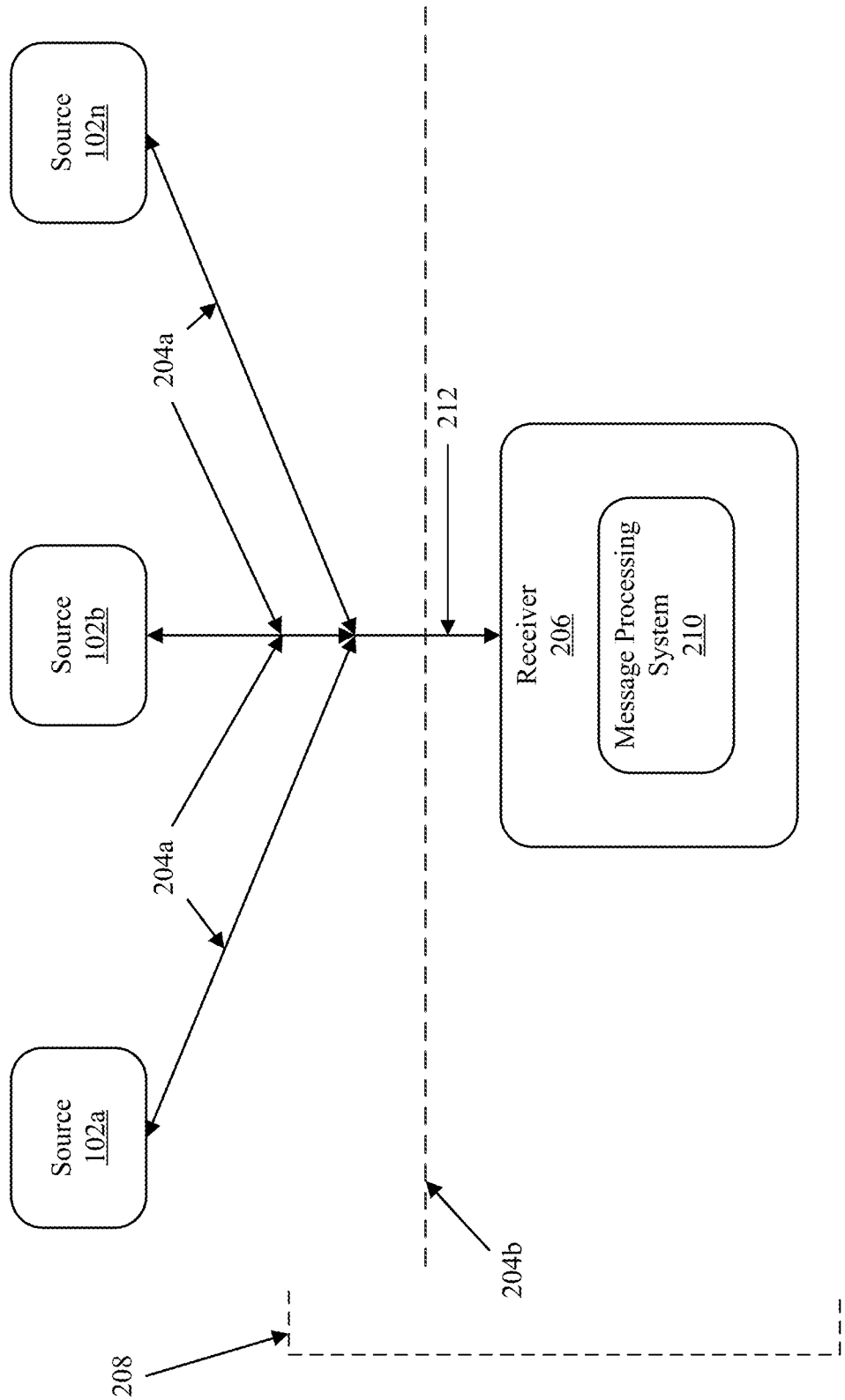
FIG. 2 depicts an illustrative environment in which the system that may be used to implement aspects of the disclosed embodiments is located.

An electronic trading system, as described above, is an example of a transaction processing system which may employ the disclosed message processing architecture. For example, in normal operation of an electronic trading system such as the Exchange described above and as will be described with reference to FIGS. 1-3B, the message handling system and messaging protocols implemented thereby may function to allow users, e.g., market participants or traders, to send messages to the Exchange comprising orders to trade, i.e., orders to buy or sell quantities of one or more tradeable items, such as financial instruments, at specified prices, requests to cancel previously sent orders, as well as other communications. The source, or sending host 102 as depicted in FIG. 1 may be a market participant 102a . . . n shown in FIGS. 2-4B such as a trader, i.e., the trading system/computer operated thereby, while the destination, or receiving host 124 of FIG. 1 may be an Exchange/electronic trading system 208, or the receiver 206 thereof as shown in FIGS. 2-3B, i.e., the devices utilized by the Exchange/electronic trading system 208 to receive and process messages received from participant computer systems 102.

In the example operation, a user/trader who decides that they wish to execute a trade order inputs, calculates or otherwise directs the creation of the necessary information 126 to complete the trade order, e.g., by using a trading software application, implemented at the Application Layer 104, executing on their source/computer system 102/102a-n. Their source/computer system 102/102a-n may be connected to the Exchange 208/Receiving Host 124, such as via, as shown in FIGS. 1-4B, an interconnecting network infrastructure 134 which may include the private and/or public network infrastructure 204a between the sources 102a-n and the electronic trading system 208, i.e. external thereto, as well as any of the internal network infrastructure 302 of the electronic trading system 208 which couples the external infrastructure with the receiving host 124/receiver 206. This may be the network 820 described in more detail below with respect to FIG. 8. This information 126 may include, for example, data indicative of the instrument they wish to transact, the side (buy or sell), the price, and the quantity. As will be described, a user/trader, or their computer system 102a-n may create an order to trade based on information available to them regarding an event, such as the state of a marketplace, e.g. based on data received via a market data feed and/or news feed, and/or other information such as based on the result of a calculation. The trading software application may be configured to format the order/message according to the iLink 3 protocol, described above, which defines what data should be included and the order/sequence and form in which that data appears in the message, i.e., the message data sequence or ordering. This may include calculating and including an error detection and/or correction code, such as a checksum value, and including it as part of order/message as dictated by the application protocol such that the application, e.g., the trading software application, may validate the order/message upon receipt.

The user's computer system 102 may implement a protocol stack conforming to the OSI model, as was described above, and depicted in FIG. 1, executing software components which implement the various layers, or a subset thereof, of the model, e.g., the layers 104, 106, 108, 110, and 112 depicted in FIG. 1. The order is input into, or otherwise computed by the trading application which, in this example, is implemented at the application layer 104 of the OSI model, which then generates the information 126, i.e. an iLink 3 formatted message, including the requisite trade order data in the proper sequence, and requisite checksum value, for transmission to the Exchange.

The information 126 comprising the order, e.g., the iLink 3 message, is conveyed from the application layer 104 to the transport layer 106 of the user's computer system 102 protocol stack via the interaction between the trading application and the software component(s) which implements the transport layer 106. Upon receipt, the information 126 is reorganized, or packaged, by the software component implementing the transport layer 106 according to the implemented transport protocol, e.g., TCP. This process is typically referred to as data encapsulation and includes segmenting the message, as will be described below, into one or more portions depending upon the message size and augmenting each of portions of the message with additional data such as the source of the message and the destination for the message. In one example, the transport protocol is TCP. In another example, the transport protocol may be UDP. With respect to TCP, the information 126 is converted into one or more TCP segments, also more commonly known as TCP packets, such as the TCP segment 128 of FIG. 1.

The amount of data that may be sent in each segment/packet may be limited. Accordingly, based on the size of the information 126 to be transmitted, e.g. the size of the iLink 3 message, the software component implementing the transport layer 106 on the user's computer 102 determines how many packets will be required to send all of the information 126. It will be appreciated that segment/packet size may in fact exceed the size of the information 126, e.g., the size of a message/order, such that multiple messages/orders may be included in a single packet. Furthermore, to maximize packet utilization where the packet size exceeds the size of one or more messages/orders with excess capacity less than an additional whole order/message, the additional order/message may be apportioned across multiple packets along with the whole orders/messages included therein. According to TCP, the information to transmit may be combined into one, and/or broken up into multiple, packets according to the size of the information and the maximum transmission unit size of the data link layer of the network to which the sender is connected. The transport layer 106 interacts or otherwise negotiates with the data link layer 110 to determine what maximum transmission size unit to use. According to the protocol specification, the largest size unit allowed by TCP is 65535 bytes, however, in practice the size of a packet may be much smaller because protocols on the network link layer may not support packets that are 65535 bytes. The typical size for TCP packets may be between, at a minimum, twenty bytes (which is the size of a TCP header) and 1500 bytes. After the transport layer 106 determines the maximum transmission unit size, the information 126 to be transmitted is broken up into packets that do not exceed the maximum transmission unit size. For example, if the information is to be sent over Ethernet, then the maximum size for any given TCP packet cannot be larger than the size of the maximum transmission unit size for the Ethernet protocol, which is 1500 bytes. Once the information is divided into packets, each packet is assigned a sequence number, i.e., in accordance with the sequence number agreed upon between the sender and receiver in the three way handshake described below. The sequence of the packets will follow the sequence of the data of the message being transmitted such that when the packet payloads are reassembled by the recipient in the packet sequence order, the original message, with the message data in the original order/sequence of data, may be recovered.

The transport layer 106 of the user's computer system 102 further begins the process of establishing a connection, referred to as a "session," with the destination computer 124. Establishing a connection includes exchanging messages between the source 102 and destination 124 computers to ensure that both computers are ready to exchange information. This exchange involves a request sent from the source 102 to the destination 124 computer to establish a logical connection, a reply from the destination 124 computer and an initial sequence number (chosen at random) to be used as part of the data to be transmitted, and an acknowledgement from the source 102 computer of the receipt of the reply and the initial sequence number to use for transferring data in the session to the destination 124 computer. This exchange of messages between source 102 and destination 124 computers is referred to as a "three way handshake." The established connection opens a session between the source 102 and destination 124 computer during which information may be exchanged back and forth in what is known as full-duplex communication. Once the connection is established, transmission of the user's information, in this case the market order data 126, which has been packaged into at least one or more TCP packets 128, to the destination computer 124 commences as will be described.

Once segmented into one or more packets, each TCP packet 128 is conveyed to the software component which implements the Network layer 108 of the sending host 102. The Network layer 108 may, for example, implement the Internet Protocol ("IP"), such as the IPv4 or IPv6 variant. The IP protocol prepares each of one or more the TCP packets 128 for delivery by formatting the TCP packet 128 into an IP datagram 130. The preparation consists of augmenting the TCP packet 128 with transportation information to form an IP datagram 130, such as what ports to use for communication, an IP header, and other information about the IP datagram such as sending and receiving hosts. Once each IP datagram 130 is properly formatted it is conveyed to the software component which implements the data link layer 110 for the sending host 102.

At the data link layer 110, the IP datagram 130 is handled according to the particular networking protocol used by the communication network 134 which, in one example, may be the Ethernet protocol. According to the Ethernet protocol, the IP datagram 130 is transformed into an Ethernet frame 132. As part of this process, the IP datagram 130 is augmented with a frame header and a frame footer. The frame header includes addressing information as may further include data specifying the type of packet (EtherType) and/or the amount of data being conveyed by the frame (with Ethernet, the amount of data conveyed by a given frame is implicit in the signaling protocol via the receipt of end-of-frame/FCS indicator). The frame footer includes a Frame Check Sequence ("FCS"), generated via a cyclic redundancy check ("CRC") algorithm, which is used by the destination computer 124, or intermediate networking devices/nodes, to check if the message was corrupted in transit from source to destination. Using the information that is included in the Ethernet frame 132, at least part of the user's original market order 126 is now ready to be physically transmitted to the destination computer 124 or receiving host 124.

Each Ethernet frame 132, which may carry one of the one or more TCP packets 128 or iLink 3 messages, travels over a physical network layer 112 via a network connection/media 134, e.g., via the packet switched network described above, until it eventually reaches the physical network layer 114 of the receiving destination 124. That is, each ethernet frame 132 is transmitted via the physical network port of the sending computer 102 over the physical wired and/or wireless networking medium coupled therewith and to the physical network port of the destination system 124. En route, the ethernet frame 132 may pass through various switches, gateway or router devices and various physical media types. These devices are generally coupled between multiple network paths, i.e., have numerous inputs coupled with different upstream paths and numerous outputs, each coupled with a different downstream path. The devices determine the destination of the various data received from the different inputs and route that data to the proper output coupled with the network path leading to the destination. As such, these devices cause frames/packets having a common destination received from multiple inputs to converge on a common output coupled with that destination.

Ultimately, the frame is received at the destination 124, e.g., the Exchange 208, such by an ingress switch device 206 or another device. The receiving host's 124 protocol stack reverses the above described process in order to provide a match engine 308, coupled therewith, with the user's trade order 126.

In particular, as each Ethernet frame 132 is received by the hardware and/or software component which implements the physical and data link layers 114 and 116 respectively of the destination host 124, the FCS for the Ethernet frame 132 is computed. Then the FCS included in the received Ethernet frame 132 is checked at the data link layer 116 against the computed FCS to ensure that the ethernet frame 132 was not corrupted in transit. The FCS may be checked via a running process which computes the FCS as the ethernet frame 132 is received and results in a specific value if the FCS is correct. If the received and computed FCS values differ, the frame 132 will typically be discarded. As will be described, in a typical implementation, it is the responsibility of the higher layers of the protocol stack, e.g., the TCP layer 118, to cause retransmission of the lost frame 132. If the frame 132 is uncorrupted, the Ethernet software program on the receiving computer 124 removes the Ethernet header and footer from the Ethernet frame 132, and the remaining IP datagram is conveyed to the Network layer 118 of the receiving computer 124.

When multiple ethernet frames 132 directed to the same destination are received, as was described above, substantially simultaneously via different inputs of a receiving intermediary device, such as a gateway or network switch, operative to direct the ethernet frames 132 to/toward the destination device, that intermediary device may be required to arbitrate among those received ethernet frames 132 to determine which to send first to its output coupled with the destination device or the path thereto. This arbitration is typically programmed into the intermediary device and may comprise a round-robin, pseudo random or other algorithm for determining which ethernet frame 132 is transmitted/forwarded to the destination first.

At the Network layer 118, the IP datagram 130 is received. The IP header is read to determine the source IP address and destination IP address as well as other data needed to route the IP datagram 130. Prior to sending the information to the transport layer 120, the IP software program 118 (or hardware based IP or TCP/IP processor) on the destination computer 124 will remove the IP header from the IP datagram 130 to extract the payload, e.g., the TCP packet, carried thereby which is then conveyed to the transport later 120.

The software/hardware which implements the transport layer 120 of the destination computer 124 provides/implements buffers which are used to store packets as they are received during the TCP session. As the transport layer 120 of the destination computer 124 receives packets, the software program implementing the transport layer 120 of the destination computer 124 sends acknowledgment messages to the source 102 acknowledging that each packet has been received. The acknowledgments are cumulative, which means, for example, that if the receiver sends an acknowledgment that a packet with sequence number ten has been received, this indicates also that packets with a sequence number less than ten have also been received and that they do not need to be sent or resent. If a packet is missing, e.g., a later sequenced packet is received before an intervening sequenced packet, an acknowledgment will not be sent causing the sender 102 to eventually resend the unacknowledged packets or all of the packets depending upon the configuration, as was described above. The received packets are put into a TCP buffer, segregated by session, where they may end up being reorganized into the correct sequence order or otherwise from which they are conveyed to the application layer as described below. The receiving host 124 may know that no more packets are forthcoming from the source 102 when the source 102 indicates no more information, or packets are to be sent but such an indication may not always be received. The received packets are put in sequence order that corresponds to the initial sequence number that was decided in the three way handshake and the sequence numbers included in each packet. At the transport layer 120 the header information is read to determine which application at the application layer 122 is to receive the information. The software program implementing the transport layer 120 of the destination computer 124 removes the header information for each packet that is received by the receiving host and adds a timestamp indicative of the time thereof. After their headers are removed, the bytes that make up the received packets are streamed in the message order to the correct application at the application layer 122 on the receiving host. The application on the application layer 122 of the receiving host receives the stream of bytes from the transport layer 120 and interprets the stream of bytes in a way that is meaningful to the application program. In particular, the application may determine whether it has received a complete message, e.g., by looking for and validating a checksum value. For example, a trading application may determine whether a proper and complete iLink 3 message has been received. As the transport layer 120 will continue to receive packets and provide them to the application, the application may need to continually check to determine whether a complete message has been received before further processing may be commenced.

In particular, once the complete iLink 3 message has been received, and its checksum validated, the complete iLink 3 message is analyzed to determine if at least one of the received augmented packets was received in an order different from the sequence between the packets. If it is determined that all of the received augmented packets were received in the same order as the sequence between the packets, the user's order 126 is provided to the order input processing functionality of the Exchange, such as an orderer 310 described in more detail herein.

In some cases, the software program implementing the transport layer 120 on the destination computer 124 may have multiple TCP sessions open, e.g., where it is simultaneously communicating with multiple sources 102, one session will be opened to handle the receipt of packets from each source 102. The packets from each source 102 may be stored/accumulated in separate buffers as they are received. For example, the Exchange may be receiving orders from multiple traders at any given time. When multiple frames 132 arrive, there is the chance of a collision occurring. A collision occurs when two frames 132 attempt to access the same medium at the same time. In the event of a collision the source 102 of each frame will attempt to retransmit their frame 132 at a (pseudo) random interval of time. In a situation where the multiple sources 102 are on the same physical network as each other and the destination computer there may not be collisions, because the software running on the data link layer 116 may set up domains for the transmission of frames 132 specific to each source 102.

Typically, the various software components which implement the protocol layers described above are implemented according to defined standards so as to interoperate as described, e.g., the operations of the protocol stacks of the sending and receiving devices 102 and 124 respectively operate in conjunction with each other to ensure reliable and efficient message delivery. However, it may be recognized that, when used with a deterministic transaction processing system, such as the electronic trading system described herein, wherein efficient and timely submission of transactions requests, e.g., orders, is desirable so as to capitalize upon available opportunities before others, the operators of sending devices 102 may be motivated to modify the operations of their protocol stack so as to optimize the operation thereof and the corresponding responsive operation of the receiving device's 124 protocol stack, in order to gain an advantage when submitting their orders.

Figure 9:
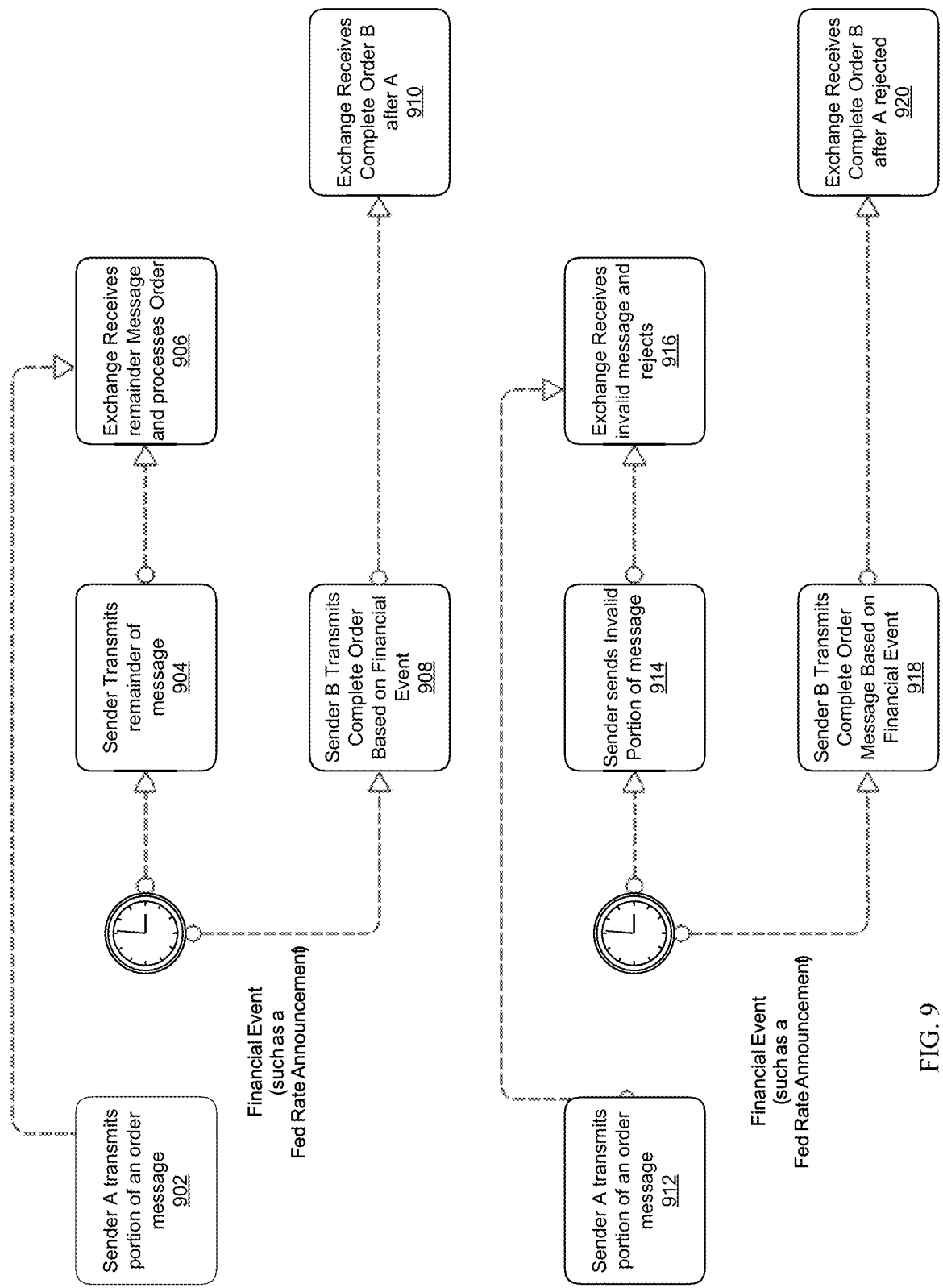
FIG. 9 depicts example scenarios to which the disclosed embodiments may be applied.

For example, as shown in FIG. 9, in many cases, a trader may wish to submit one or more orders to trade responsive to the occurrence of an event, such as based on receipt of information, e.g., a price change received via a market data feed, or information regarding a news/current event such as the announcement of an interest rate change, or based on the result of a computations/calculation such as calculation of a price curve, etc. Typically, once a trader, e.g., Sender B, has knowledge of the occurrence of the event, they follow the process described above to create and submit one or more orders to trade based thereon (Block 908 and 918). The event may alternatively be referred to as a "trigger" as the occurrence of the event triggers other activity, e.g., the submission of a trade order or other transaction request. It will be appreciated that the event may be just the initial receipt of the indication of the occurrence of another event, e.g., the initial receipt of the data, i.e., one or of the bits/bytes/signal, of a market data message announcing a change in the market. The event may be one of a series of pre-cursor events leading to a final or cumulative event, each of which me be considered an event herein. Alternatively, or in addition thereto, the event may be considered a generation, i.e., a receipt of perception of the minimal amount of information about which to make an event dependent decision as contemplated herein.

However, some, e.g., Sender A, may recognize that these trade order messages, e.g., the iLink 3 message, contains numerous pieces of data and, due to the size of the message, e.g., the amount of data to be transmitted, the message will take a certain amount of time to transmit. In this case, the application layer or TCP protocol may be optimized, e.g., manipulated, e.g., using the TCP retransmission technique, for all or a subset of the trade order messages, to generate, prior to the occurrence of the event, one or more TCP packets comprising the event independent data, such as the trader identifier, source information, etc., and transmit at least some of those packets first before the event occurs as shown in FIG. 9 (Block 902). Those packets may be constructed to appear, based on the sequencing data, etc., as if they were constructed based on the entire iLink 3 message when, in fact they were not. Once the event occurs and any event dependent order data is determined, such as price, quantity, side, instrument, message checksum, etc., the TCP software is directed to generate one or more TCP packets comprising the event dependent data and transmit those packets to complete the iLink 3 message, the late arriving packets merely appearing to the receiving device as having been delayed in transit (Block 904). As compared to the overall size of the iLink 3 message, these remaining TCP packets comprise a smaller amount of data and therefore take less time to transmit. Accordingly, relative to the time of the occurrence of the event, the trader, e.g., Sender A, is sending less post-event data to the Exchange and therefore is able to send that data faster, e.g., having their order considered to be received first before the order of Sender B as shown in FIG. 9 (Block 906 and 910). To the receiving device 124, its protocol stack, unconcerned with the occurrence of the event, merely sees the packets of the complete message arriving out of order and perhaps at irregular intervals, which of course, it is designed to handle as described above.

Further, it may also, or alternatively, be recognized that a trade order message, as broken down into packets/frames, etc., as described above, may be corrupted in transit, such as due to faulty intermediate hardware or software, and need to be resent. Again, these are circumstances that the above described protocols are designed to handle. Further it may be recognized that messages, packets or frames may be intentionally corrupted. For example, prior to occurrence of an event, a trader may cause their sending system 102 to transmit one or more speculatively generated messages, e.g., a message or order generated based on a speculated outcome of the event, whereby at least part of the speculatively generated message is reserved, e.g., held back (Block 912). For example, a trader may determine that an event has multiple different outcomes and may create one or more speculative orders, or one or more TCP connections for the communication thereof, based on each possible outcome. Once the event occurs and the trader knows of the actual outcome, the trader may determine whether or not they actually want any of the speculatively generated messages. For those messages they want, they correctly transmit the reserved portion whereas for any messages they do not want, they do not send, or they otherwise corrupt, the reserved portion so as to cause the receiving protocol stack to invalidate the portion already received. For example, a user may construct an Ethernet frame comprising a payload of data indicative of a speculative order based on trader's guess as to the outcome of the event. They may then begin transmitting this Ethernet frame, reserving the FCS until the outcome of the event is known. Once the event occurs, concludes or otherwise finishes occurring, if the trader still wants the outgoing/in-process order, they transmit the correct FCS for the outgoing packet. However, if they do not want the order, they can transmit an incorrect FCS causing the receiving device 124 to discard the frame or otherwise cause the packet to not be processed by the electronic trading system. Similarly, the trader may cause the transmission of all but a reserved portion of the TCP packets which constitute an iLink 3 message of their speculative order. Once the event occurs, if the trader still wants the order, they can correctly transmit the remaining portion whereby, not only has the previously transmitted portion potentially been received prior to a competing order but the transmission of the remaining portion requires less time to transmit thereby, with respect to the timing of the occurrence of the event, allowing the trader to submit their order more quickly, potentially, for example, with a minimum sized packet with a minimal or the absolute smallest serialization time through the network. However, if they no longer want the order, they may corrupt the TCP packet (Block 914) or otherwise terminate the TCP session with the receiving device 124, causing the receiving device 124 to discard any received data (Block 916). The receiving device 124 may receive and process the complete order of Sender B after discarding the received data of Sender A (Block 920). In electronic trading systems which implement TCP in a mode which enforces packet sequencing, a user may transmit multiple TCP packets of a sequence, each containing, for example, a trade order, but intentionally send those TCP packets out of order, e.g., reserve the first TCP packet of the sequence, knowing the receiving system will not process, i.e., will block processing, those TCP packets of the sequence that were received until the missing TCP packet of the sequence is received. For example, a user may create a sequence of five TCP packets each containing a partial, single or multiple trade orders and transmit packets 2-5 to the receiving system, reserving packet 1. The receiving system will receive and buffer, but then block from further processing, packets 2-5 until the user finally sends packet 1. In this way, a user may front-load multiple messages, e.g., multiple trade orders, in advance of an event, such as to minimize the amount of data needed to be sent, and thereby the latency, at the later, e.g., critical, time, secure priority of processing in the receiving system's buffer, and control when those messages are processed, e.g., subsequent to the occurrence of the event, by transmitting the remaining out of order packet. This may be combined with the above described transmission of incomplete messages whereby the trader frontloads messages, some or all of which maybe incomplete, as was described above, e.g., missing event dependent data such as a price or checksum. In this manner, the sender may not only control when a batch of frontloaded messages are processed, via the sending of an out of sequence message, but which of, or in which order, those messages will be processed, by sending the remaining portions, e.g., the missing bits/bytes, to complete only those messages of the batch they want and, for example, corrupting the remainder.

The scenarios described above may be referred to as "optimistic messaging". In at least some of these cases, at least some of the event independent messages or portion of one or more messages may be transmitted before the event occurs, i.e., before the sender knows that they want the message. Subsequent to the event, the remaining messages or event dependent portion, and any remaining event independent portion, is transmitted which may complete or corrupt the messages or the portion previously sent depending upon desire/intent of the sender. As will be described, the event independent portion may include any data which has no dependence, or which is not intended to have dependence, upon the occurrence or result of the event or any data which is sent prior to the occurrence of the event which may include speculative data generated based on an anticipated occurrence or result of the event, whereas the event dependent portion includes any data generated, or intended to be generated, based on the occurrence or result of the event or any data transmitted after the occurrence or result of the event. To the receiving device 124, its protocol stack, unconcerned with the occurrence of the event, merely sees the packets of the complete message arriving out of order or, in the case of the corruption, the receiving device 124 may not see the packets arriving at all. The receiving device 124 either waits for a threshold amount of time (heartbeat interval), for example, 60 seconds, before it discards the packets. As will be discussed, this out of order receipt is sufficient trigger action by the disclosed embodiments.

Other examples of such optimistic messaging behavior may be further evidenced by 1) a user of the system continuously streaming Ethernet frames at or near the maximum transmission rate and corrupting the sent Ethernet frames by sending an invalid FCS for the Ethernet frame, or 2) a user beginning to send out a to-be-corrupted Ethernet frame on the receipt of every incoming packet (before its full payload has been received).

As was described above, the messaging protocols are designed to handle intermittent problems with the communication of messages across networks, e.g., packet loss, bit loss, data corruption, race conditions, multi-path latency variance, etc. Further, it is understood that the mechanisms implemented to handle these problems come at a certain cost/overhead, e.g., additional network congestion and bandwidth consumption due to retransmission, computational processing consumption due to having to continually evaluate and determine when messages are complete or not and generate retransmission requests, etc. However, when the protocols are optimized so as to unnecessarily trigger these remediation mechanisms, resources, particularly of the receiving devices 124, are unnecessarily wasted which may then degrade the performance of those devices, in particular with respect to their ability to interact with other traders not engaging in such activity. In addition, where an attempt to modify these protocols results in a defective implementation, such a defective implementation may result in additional packets being sent which may further unnecessarily consume resources of the receiver and in extreme cases affect the performance and/or availability thereof.

More particularly, message protocols, such as those used to implement each layer of the protocol stack, are used to ensure how information is transmitted along a network, in particular the order in which information is transmitted and the way in which information is transmitted. In some instances users of a system may seek to optimize, or otherwise capitalize on, the intricacies and/or operation of a message protocol, such as by utilizing optimistic messaging, i.e., sending a message or starting to send a message before a user actually knows that they want to send the messages, etc., i.e., before the user has the information the user needs in order to know if the user wants the message to be sent, thereby taking advantage of the "reliability" features of the protocol to front load their transmission. For example, a user may transmit a portion of a message, but not transmit the remaining portions of the message until the occurrence of an event. Further, a user may intentionally optimize the order in which packets, containing whole messages or portions thereof, of data are sent to a receiving computer 124 so as to reserve the event dependent portions thereof for transmission only once the event has occurred. In doing so, the bulk of a message or messages may be transmitted in advance of an event with a smaller portion being transmitted later, only after the event has occurred, maximizing the sender's window of opportunity and/or capitalizing on the smaller portion taking less time to transmit and thereby effectively decreasing the latency of transmission of the overall message with respect to the timing of the occurrence of the event. Alternatively, or in addition thereto, the sender, depending upon the outcome of the event, may determine that they no longer wish to send the message at all and, therefore, take some action to cancel the previously transmitted portion, such as by terminating communications with the receiver or intentionally corrupting the remainder of the message to cause the receiver to discard the message.

For example, in some embodiments the transaction processing system may be a financial exchange, like the Exchange 208 of FIGS. 2-3B. A function of the financial exchange is to generate data regarding events, such as financial market data events, e.g., price changes, changes in available quantity, availability of new orders, and transmit that data to the market participants. The users of the financial exchange may be tracking the occurrence of such events and basing their buy/sell orders upon the occurrence thereof. The event may be a market data event (such as a price movement for an equity that a user is following), an event that is unique to the participant (such as a price movement for an equity the participant already owns, or an indication that prior offer to buy or sell has been transacted), completion of a calculation conducted by the participant (such as a calculation of a relationship between equities, or a calculation of a relationship between markets), or any other type of event that may be of interest to the participant, such as an event external to the market itself, e.g., a regulatory/government/corporate announcement, a weather event, a political event, etc.

The data messages sent by a user may consist of two conceptual parts, as was described above: an event dependent portion and an event independent portion. The two portions may be delimited in relation to the occurrence, i.e., timing thereof, of an event (or the timing of when the user may have learned of the occurrence of the event), such as an event that may be of interest to a user of the system. The event may be receipt of information, receipt of the result of computations, or some other information of interest to the user. For example, a user of a financial market may seek to capitalize on information relevant to trading. The user may start to send the necessary information to complete a buy/sell order on the financial market. The user may intend to optimize the transport protocol, of the transport layer, by altering the order in which information is sent as part of their buy/sell order. For example, by optimizing the TCP protocol of the transport layer and/or the interaction of the application layer therewith, the user may break up their buy/sell order into packets, and then cause delivery of all, or most, of the packets that contain event independent information before generating and/or sending the packet containing the event dependent information. By controlling the delivery and order of packets, the user may send the majority of the packets in advance of receiving information that is relevant to the buy/sell order, thereby ensuring that when the event dependent information is sent the transmission of the event dependent packet is quicker than it would be otherwise.

As discussed above, a user may be motivated to optimize, e.g., manipulate, the protocols in order to get their trade order to an exchange before others based on as much information as possible. Even a user with a fast connection may want to optimize the protocols to be sure they beat other users with similarly fast connections and reaction times, etc.

Optimistic user behavior may include optimizing the protocol at, for example, the data link layer. More particularly, optimizing the Ethernet protocol may include: 1) a user of the system continuously streaming Ethernet frames across one or more physical connections at or near the maximum transmission rate, regardless of whether it has begun to receive any messages from the exchange, and then, e.g. in a majority of cases, corrupting the sent Ethernet frames by sending an invalid FCS for the Ethernet frame or otherwise generating the traffic to ensure the packet is dropped, or 2) a user begins to send out a potentially to-be-corrupted Ethernet frame on the receipt of every incoming packet (before its full payload has been received). In the second example the user may have software and/or hardware coupled at the data link layer which determines, after having already started transmitting a packet, whether to correctly send the bits which make up the FCS of the Ethernet frame until the user receives additional information, which causes the user to determine to either correctly complete or otherwise corrupt or alter the outgoing Ethernet frame.

While the disclosed embodiments may be discussed with respect to the TCP/IP and/or Ethernet protocols, it will be appreciated that the disclosed embodiments may be used with any network or communications protocol implemented at any physical and/or logical layer, particularly those which implement packet management, optimization and/or manipulation protocols, such as error correction or reliability protocols. For example, the disclosed embodiments, as opposed to being implemented with "best effort" protocols, may be implemented with respect to packet prioritizing or network resource conservation/reservation mechanisms, such as quality of service (QOS) protocols, which act, for example, to prioritize the transmission of some data over other data, e.g. based on source, data type, network congestion level, time of transmission, etc. It will be appreciated that such protocols may be managed/optimized, as described above, to intentionally optimize the delivery of messages, such as trade order messages, as described.

FIG. 2 depicts an illustrative environment in which the disclosed message processing system 210 may be implemented as described. In FIG. 2, the message processing system 210, which in some embodiments may be coupled with or be part of a receiver 206 of the electronic trading system 208, receives messages and transmits messages via a network 204a between sources 102a . . . n and the receiver 206 of the electronic trading system 208. As described herein, the receiver 206 may comprise a network switch, such as the ingress switch of electronic trading system 208, i.e., the first network component to receive incoming messages from the network 204a, or another network switch within the network infrastructure 302 of the electronic trading system 208, such as the last network switch prior to the orderer 310, or the orderer 310 itself, as will be described below. The receiver 206 may further comprise a component of the network interconnection or protocol stack of a switch or the orderer 310 as described above, e.g., the receiver 206 may be the software and/or hardware components which implement the protocol stack of a network switch or the orderer 310, etc.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

FIG. 2 depicts exemplary computer devices, or sources, 102a, 102b, and 102n which may comprise different exemplary methods or media by which a computer device may be coupled with, either directly or indirectly, the message processing system 210 or by which a user may communicate, e.g., send and receive, trade or other information therewith. It will be appreciated that the types of computer devices deployed by market participants and the methods and media by which they communicate with while interacting with the message processing system 210 are implementation dependent and may vary and that not all of the depicted/described computer devices and/or means/media of communication may be used and that other computer devices and/or means/media of communications, now available or later developed may be used. Each computer device, which may comprise a computer 800 described in more detail below with respect to FIG. 8, may include a central processor that controls the overall operation of the computer and a system bus that connects the central processor to one or more conventional components, such as a network card or modem. Each computer device may also include a variety of interface units and drives for reading and writing data or files and communicating with other computer devices and while interacting with the devices that make up the message processing system 210. Depending on the type of computer device, a user can interact with the computer with a keyboard, pointing device, microphone, pen device or other input device now available or later developed.

An exemplary computer device 102a is shown coupled with the electronic trading system 208, via a network 204a such as via a T1 line, a common local area network (LAN) or other wired and/or wireless medium for connecting computer devices, such as the network 820 shown in FIG. 8 and described below with respect thereto. The electronic trading system 208 may further include a network infrastructure 212, such as the physical network layer 302 shown in FIGS. 3A and 3B, to interconnect the network 204a with the receiver 206. This infrastructure 212 may be implemented by a network such as the network 820 shown in FIG. 8 and described below with respect thereto. The interconnection/interface between the network 204a and the network infrastructure 212 of the electronic trading system 208, which may be referred to as an "edge" 204b, demarcates the internal network of the electronic trading system 208 from the external public network 204a, as described below. The user of the exemplary computer device 102a, or the exemplary computer device 102b alone and/or autonomously, may then transmit a trade or other information to the receiver 206 where the trade or other information is handled by the message processing system 210.

As was described above, the sources 102a . . . n, i.e., the market participants, may include one or more market makers which may maintain a market by providing constant bid and offer prices for a derivative or security to the electronic trading system 208, such as via one of the exemplary computer devices depicted. One skilled in the art will appreciate that numerous additional computers and systems may form part of the electronic trading system 208. Such computers and systems may include clearing, regulatory and fee systems.

The sources 102a, 102b, and 102n, transmit messages to the receiver 206 over a network 204a. These messages are received at the receiver 206 after they cross a network edge 204b, e.g., the logical demarcation between the network 204a and a network infrastructure 212. Specifically, the network edge 204b may be a logical boundary of the exchange 208, which may also be referred to as the demarcation point or edge 204b, may be defined as the first, or last, point at which the receiver 206, or other network components controlled by the electronic trading system 208, can control or otherwise optimize an incoming, or outgoing, transmission, e.g. data message or packet. For example, for an outgoing data packet, the edge 204b of the exchange 208 may be defined as the last point at which the receiver 206, or component thereof, can recall or otherwise stop the transmission. For example, the demarcation point or edge 204b may be the point at which a market data message is provided to the protocol, e.g., multicasting or unicasting, for transmission or other point where data packets are individually forwarded toward their respective destinations, e.g., individually distinguishable by destination address. In at least one disclosed embodiment, the edge or demarcation point 204b may further be defined as the point at which data messages or packets destined for multiple market participants are transmitted, e.g., multi-casted or otherwise, simultaneously, or substantially simultaneously, i.e., transmitted within short a time period such that an observer would consider them simultaneously transmitted or otherwise find the difference there between practically, logically or physically imperceptible. Thereafter, variation in network path latencies, etc. may impart unequal delays on the delivery of those messages.

Generally, the edge 204b will lie between a component in the electronic trading system 208, such as the receiver 206, and another component controlled by another entity, such as an Internet Service Provider or other operator of another network. As described above, the edge or demarcation point 204b may be geographically located anywhere, e.g., it may be geographically proximate to or remote from the receiver 206. In some embodiments, market participants may collocate devices for receiving data from the receiver 206 in the same geographic location as the components of the receiver 206 which transmit that data.

The operations of computer devices and systems shown in FIG. 2 may be controlled by computer-executable instructions stored on a non-transitory computer-readable medium. For example, the exemplary computer device 102a may include computer-executable instructions for receiving order information from a user and transmitting that order information to the receiver 206. In another example, the exemplary computer device 102a may include computer-executable instructions for receiving market data from the receiver 206 and displaying that information to a user.

Typically, messages from the sources 102a . . . n to the electronic trading system 208 are handled in the order, or sequence, in which they are received. The message processing system 210 of FIG. 2, utilizing the disclosed embodiments, allows for moving away from handling messages in pure sequence (e.g., the Equilibrium model) and may reduce the value of being the very fastest user of a system with the smallest, e.g. absolute smallest, packet size. Moving toward the Equilibrium model may result in a more equitable system of handling messages and allow customers of the electronic trading system to focus on optimizing trading logic (offering or bidding better prices) rather than focusing resources on low level details of particular underlying messaging protocols or particular vendors' implementations of those protocols which may trivially impact serialization time by a few nanoseconds but therefore lead to reduced queue spot.

Of course, numerous additional servers, computers, handheld devices, personal digital assistants, telephones and other devices may also be connected to the message processing system 210. Moreover, one skilled in the art will appreciate that the topology shown in FIG. 2 is merely an example and that the components shown in FIG. 2 may include other components not shown and be connected by numerous alternative topologies.

Figure 3A:
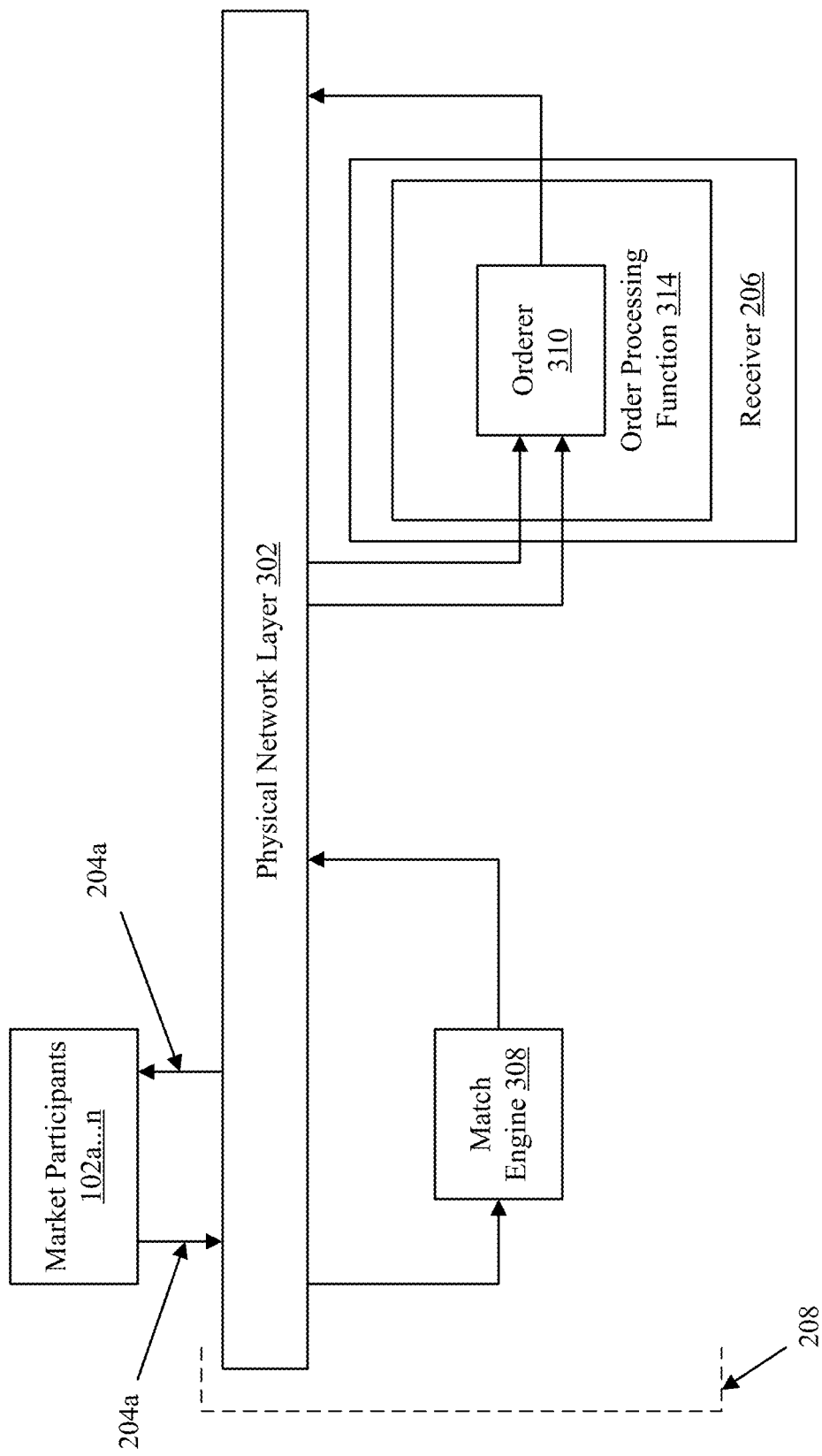
FIG. 3A depicts an illustrative electronic trading system with which the disclosed embodiments may be utilized.
Figure 3B:
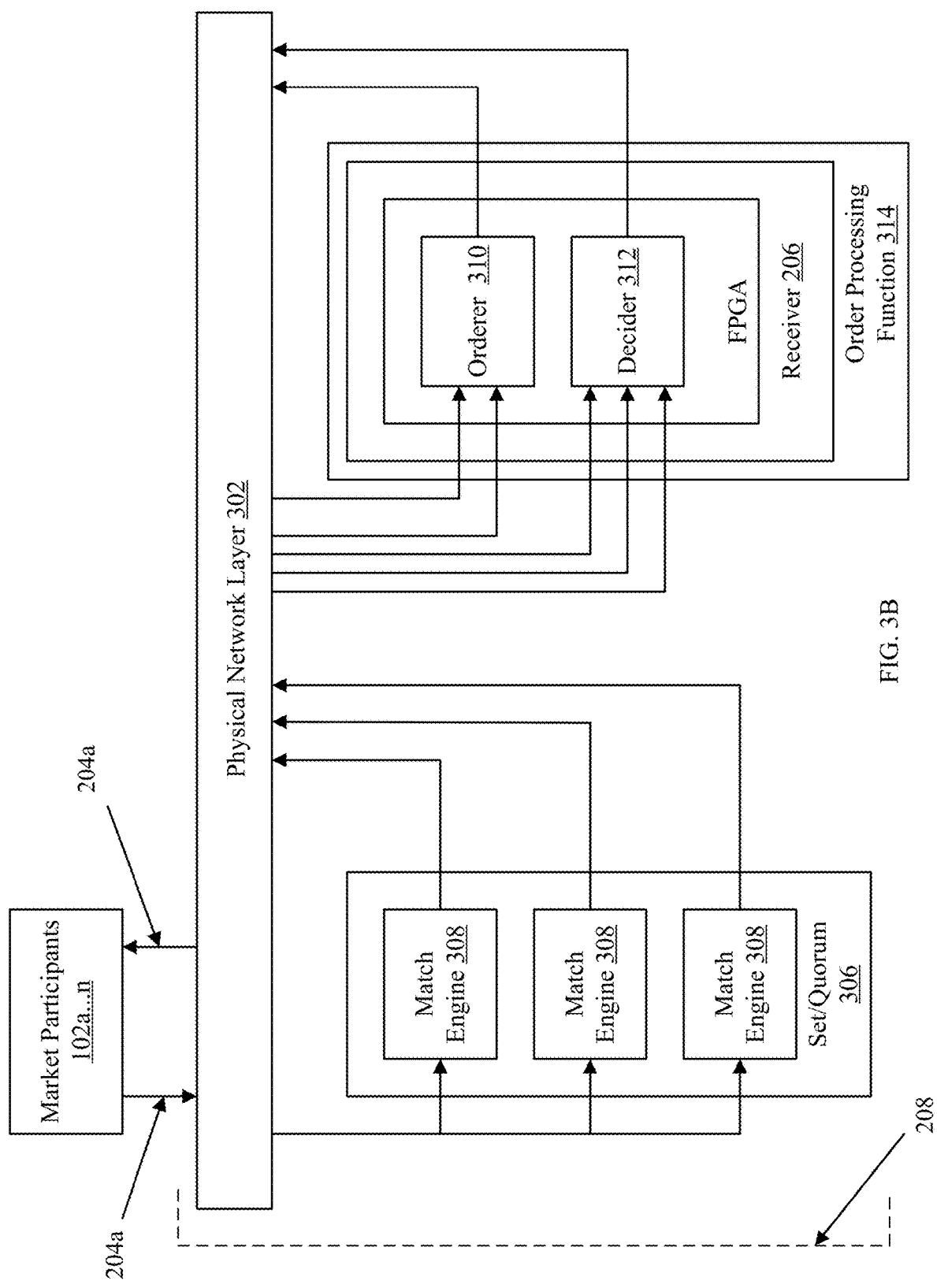
FIG. 3B depicts an alternative illustrative electronic trading system with which the disclosed embodiments may be utilized.

In particular, example architectures, depicted in FIGS. 3A and 3B, for an electronic trading system 208 are disclosed which may be used with the disclosed embodiments. These architectures for the electronic trading system may be dependent on reliable handling of messages received by the electronic trading system.

In one implementation, as shown in FIG. 3A, the electronic trading system 208 may include a receiver 206 which may comprise one or more network devices, such as switches, gateways, etc. which are coupled with a physical network layer 302 which interconnects the receiving device 206, and generally the electronic trading system 208, with the public network 204a and market participant systems 102a-n, etc. The receiver 206 may comprise an ingress switch to the electronic trading system 208. The receiver 206, which may comprise an orderer 310 as described herein, receives incoming transaction requests, e.g. incoming trade orders, and forwards them to a match engine 308, e.g. via the physical network layer 302, for matching as described herein. It will be appreciated that, for the purpose of this disclosure, the receiver may further include the last network component, e.g., switch, gateway, router, etc., which precedes the orderer 310. Other components, not shown, may, based on the result of the matching process, formulate reporting or market data messages and transmit those messages to the market participants 102a-n.

While the orderer 310 of FIGS. 3A and 3B may be thought of as the point of determinism for the exchange 208, as each transaction is then augmented with an indicium, such as a time stamp or other sequence encoding, indicative of its order of receipt relative to the other received transactions, ensuring their ordered processing thereafter, the receiver itself may actually be considered the point of determinism. That is so because as trade order messages, i.e. the frames/packets which comprise those messages, are received by the exchange 208 and routed/forwarded to the receiver 206 by physical network layer 302, they ultimately converge at the input of the receiver 206 where they are serialized in the order of receipt (or based on the arbitration protocol of the network device as was described above) and provided to the orderer processor 310 which then ascribes the time stamp to the transactions that have essentially been already ordered/sequenced based on their time of receipt relative to one another.

The sequenced transactions are then provided to the match engine 308, as shown in FIG. 3A or substantially simultaneously communicated, e.g., broadcasted, to each match engine 308 of the set of redundant match engines 306, in the implementation of FIG. 3B, each of which then processes the transaction, based on the sequencing imparted by the orderer 310, and determines a result, referred to as a match event, indicative, for example, of whether the order to trade was matched with a prior order, or reflective of some other change in a state of an electronic marketplace, etc. As used herein, match events generally refer to information, messages, alerts, signals or other indicators, which may be electronically or otherwise transmitted or communicated, indicative of a status of, or updates/changes to, a market/order book, i.e., one or more databases/data structures which store and/or maintain data indicative of a market for, e.g., current offers to buy and sell, a financial product, described in more detail below, or the match engines associated therewith, and may include messages which are indicative of, or otherwise generated based upon:

REST—indicates that a new order has been placed on an order book but not matched with a previously received order counter thereto (this event may also be indicated by a series of price improvement match events or deep book change match events, which may both be considered rests);

FILL—indicates that a new incoming order has been matched with one or more previously received but unsatisfied orders which were resting on an order book resulting in a trade;

MOD—indicates that an existing/resting order's values (price, quantity, etc.) have been modified/changed;

CANCEL—indicates that an existing/resting order has been canceled/removed;

MARKET OPEN—indicates that a market for trading has opened;

MARKET CLOSE—indicates that a market for trading has closed;

MARKET HALT—indicates that a market for trading has been paused for some period of time due to internal restrictions (usually that price velocity has gotten too high);

NEW PRODUCT—indicates that a new product is available;

CLOSE/CANCEL PRODUCT—indicates that a product is removed from trading;

PRODUCT TRANSITION—indicates that the market for a product is transitioning state, e.g. opening, closing, pausing, or reserving;

TRADING SCHEDULES—indicates the market hours;

FIRST TRADE—indicates that a first trade for a product has been placed;

PRODUCT LIMITS—indicates the price limits for a product;

TRADE—indicates that a trade for a particular product has occurred;

BUST—indicates that a trade has been invalidated;

RFQ—indicates a request for quote, e.g., a request to send in orders for a particular product;

HEARTBEAT—indicates an administrative message of the electronic trading system used to ensure communications of market events are functioning properly; or other event or status.

FIGS. 3A and 3B show a block diagram depicting, in more detail, an example of the receiver 206 shown in FIG. 2, according to one embodiment. In one embodiment the receiver 206 may include a switch. In another embodiment the receiver 206 may include a TCP buffer. The electronic trading system 208 includes an interconnecting infrastructure, such as a physical communication network 302, which may include network devices such as gateways, switches, and interconnecting media there between, such as backplane interconnects, optical and electrical communications media or other wired or wireless interconnect. The interconnecting infrastructure generally couples the various components of the electronic trading system 208 together and with market participant devices 102a . . . n.

The electronic trading system 208 includes a match engine function embodied in the match engine 308. In FIG. 3B, the match engine function may be implemented by one or more sets 306 of redundant transaction processors 308. While a single set 306 of match engines 308 will be described herein, as shown in FIG. 3B, it will be appreciated that many such sets 306 may be implemented both to improve fault tolerance through redundant operation and to increase the transaction handling capacity of the electronic trading system 208, which encompasses an exchange.

Coupled with the match engine 308, via the interconnecting infrastructure, is an order processing function 314 of the electronic trading system embodied in the receiver 206. In one embodiment, the order processing function 314 is implemented on one or more FPGA devices, i.e. by one or more logic components thereof, coupled with the network gateway device (not shown), such as via a backplane interconnect, through which incoming transactions ingress the electronic trading system 208 and outgoing messages egress the electronic trading system 208. The network gateway device, such as the receiver 206, is further coupled with the interconnecting infrastructure to which the match engine 308 is also coupled. As shown in FIG. 3B, it will be appreciated that the set 306 of transaction processors may be coupled with the order processing function 314 via other means such as a dedicated interconnection there between. Further, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

The order processing function 314 receives incoming transactions from the market participants 102 and ensures deterministic processing thereof, i.e., that the incoming transactions are processed according to the defined business rules of the electronic trading system 208, e.g. in the order in which they are received by the receiver 206. Further, the order processing function 314 receives the output of the match engine 308 and evaluates that output to determine the correct result. The order processing function may then further generate, or cause to be generated, appropriate acknowledgements and/or market data based thereon which are then communicated to the market participants 102.

FIG. 3B depicts an alternative illustrative electronic trading system that may be used to implement aspects of the disclosed embodiments. The system includes a physical network layer 302, a set of match engines 306, a plurality of match engines 308, an orderer 310, a decider 312, an exchange 208, and a receiver 206. The orderer 310 and/or the decider 312 may be implemented as an FPGA and/or as part of the receiver 206.

More particularly, FIG. 3B depicts a block diagram of an exchange 208, which may also be referred to as an architecture, for processing a plurality, e.g. a series or sequence, of financial transactions, such as orders to trade a financial product, received via a network, from a plurality of market participants 102a . . . n, the processing of each transaction operative to cause a change in a current state of an electronic marketplace for one or more financial products. In one embodiment, each transaction may comprise a request to transact, e.g., an order to buy or sell, one or more financial products. A request to transact may further comprise a request to cancel a previous transaction, a status inquiry or other transaction.

The order processing function 314 of the exchange 208 is embodied by a transaction receiver 310, e.g., an orderer as described above, which may be implemented as one or more logic components such as on an FPGA which may include a memory or reconfigurable component to store logic and processing component to execute the stored logic, such as via the interconnection infrastructure 302, and operative to receive each of the plurality of financial transactions and, upon receipt, augment, or otherwise ascribe or associate with, the received financial transaction with sequence data, such as an ordering or sequence, e.g., a sequence number or time stamp, indicative of a relationship, temporal or otherwise based on business rules/logic, e.g., a deterministic relationship, between the received financial transaction, e.g., the time of receipt thereof, and any of the plurality of financial transactions, e.g., the times of receipt thereof, previously and/or subsequently received by the transaction receiver 310. The ascribed ordering may then implicitly define the relationship with those transactions received thereafter. In one embodiment, the ordering may be an indicator of sequence, e.g., time stamp or, alternatively, an incremented sequence number.

The exchange 208 also includes a plurality 306 of transaction processors 308, e.g., match engines, coupled with the transaction receiver 310, such as via the communications infrastructure 302, each of the plurality 306 of transaction processors 308 operative to receive each of the augmented financial transactions and process, e.g., apply the business logic/matching algorithm to, the received augmented financial transaction in accordance with the sequence data to determine the change in the current state of the electronic marketplace caused thereby. As was described above, the processing is irrespective of the sequence in which each of the augmented financial transactions are received from the orderer processor, which may be different from the relationship indicated by the sequence data and which may result in a different change in the state of the electronic marketplace.

In one embodiment of the exchange 208, each of the plurality 306 of transaction processors 308 operates asynchronously with respect to the others of the plurality 306 of transaction processors 308, but, if operating properly, process the augmented financial transactions the, same, i.e., according to the sequence data and the applicable business rules. It will be appreciated that transaction processors 308 of redundant set 306 may be added or removed at will.

In one embodiment of the exchange 208 wherein the relationship indicated by the sequence data of a particular augmented financial transaction with respect to others of the augmented financial transactions is different from a relationship indicated by the order of receipt by one or more of the plurality of transaction processor of the particular augmented financial transaction with respect to the others of the augmented financial transactions, such as due to underlying processing priorities, transmission and/or routing anomalies, and would result in a different state change in the electronic marketplace.

In one embodiment of the exchange 208, each of the financial transactions comprises a request to transact in one of the one or more financial products, such as futures contracts or other financial instruments, e.g., swaps, equities, etc., the processing of each augmented financial transactions comprising identifying whether a previously processed augmented financial transaction remains incomplete and is counter thereto and, if so, indicating that a transaction there between may be completed, and if not, indicating that data indicative of the availability of the augmented financial transaction be stored in a database. It will be appreciated that while the disclosed embodiments are described with respect to the processing of financial transactions, the disclosed embodiments may be implemented with other transaction processing systems featuring or otherwise being characterized by a competitive deterministic behavior as described herein, such as systems which sell tickets or passes to events, e.g. concerts or sporting events, systems which sell unique or limited quantities of items, such as antiques, or other consumer goods/products having a restricted supply.

The order processing function 314 of the exchange 208 is further embodied by a decider processor 312 as described above, which may be implemented as one or more logic components such as on the same or a different FPGA as the orderer processor 310, coupled with each of the plurality 306 of transaction processors 308, such as via the communications infrastructure 302, and operative to receive therefrom at least one of the determined changes in the state of the electronic marketplace for each processed augmented financial transaction and, based thereon, determine a selected change in the current state of the electronic marketplace for the processed augmented financial transaction and apply the selected change in the current state of the electronic marketplace to update the state of the electronic marketplace, the current state of the electronic marketplace now reflective thereof.

In one embodiment of the exchange 208, the transaction receiver 310 and decider processor 312 are implemented in a network switch coupled with the data link layer/network layer of the communications infrastructure.

In one embodiment of the exchange 208, the decider processor 312 is operative to compare the received determined changes in the state of the electronic marketplace for each processed augmented financial transaction, and determine the selected change in the current state of the electronic market place to be the received determined change in the state of the electronic marketplace for each processed augmented financial transaction provided by, for example, the majority or a quorum of the plurality of transaction processors.

In one embodiment, the exchange 208, the decider processor 312 may further determine that a transaction processor 308 of the plurality 306 of transaction processors 308 is faulty when the determined change in the state of the electronic marketplace for a processed augmented financial transaction received therefrom fails to agree with the determined changes in the state of the electronic marketplace for a processed augmented financial transaction received from at least one other of the plurality 306 of transaction processors 308. The determination may be subject to a time delay threshold defining an amount of time which must elapse without having received a result before a fault is declared.

As will be described, this threshold may be defined so as to prevent determination of a fault when a delayed result is expected, such as when a particular transaction processor 308 is known to be performing maintenance operations or is otherwise busy, offline or deactivated.

As described above, the financial transactions processed by the system depicted in FIGS. 3A and 3B may all be received as messages, data messages or electronic data messages. The financial transactions, and their corresponding parts, or portions, may all be sent through the network, including the physical network layer 302, and the messages will at one point be handled by the receiver 206, or gateway.

Figure 4A:
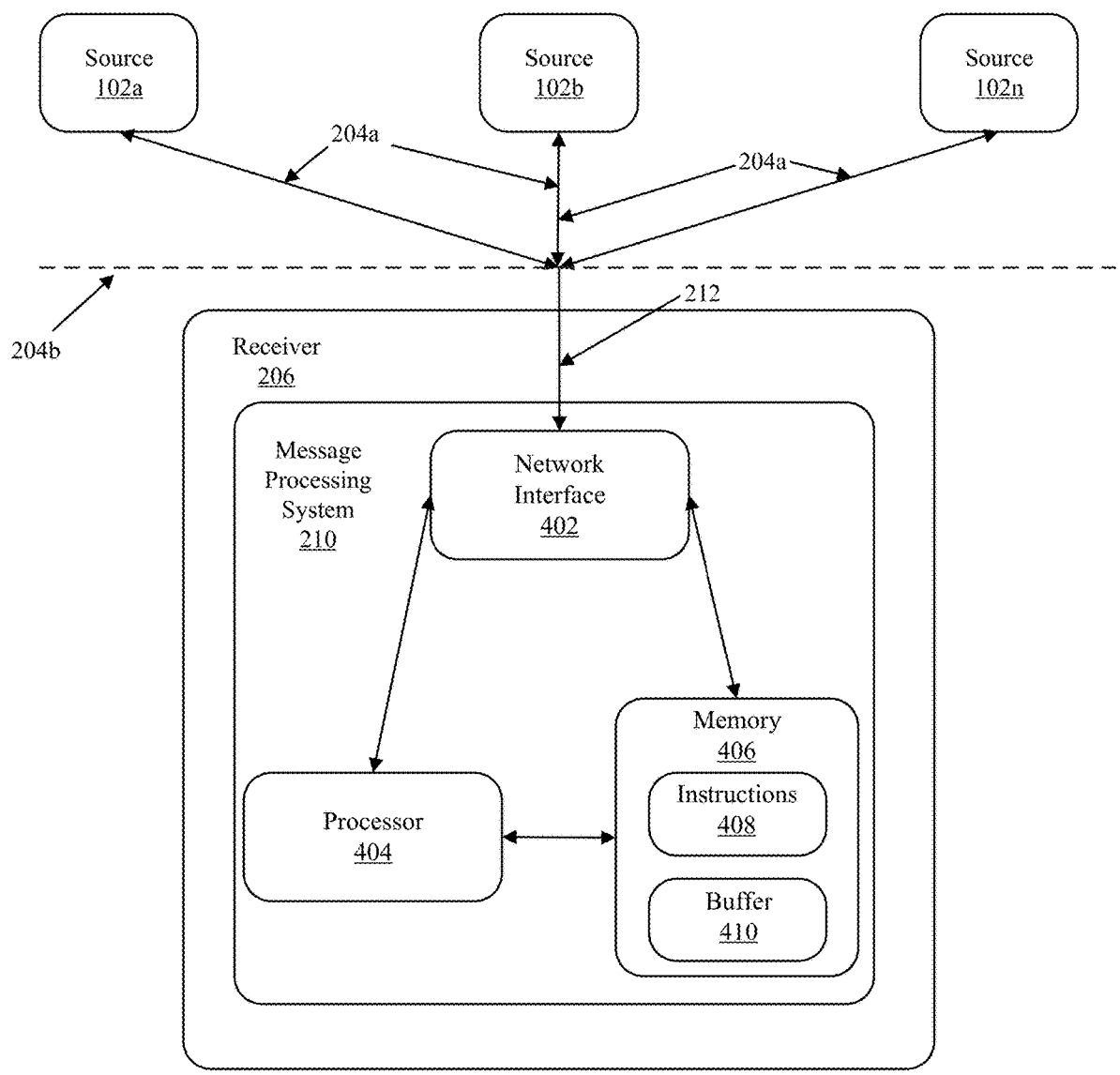
FIG. 4A depicts an illustrative implementation according to the disclosed embodiments.

FIG. 4A depicts an illustrative implementation of the message processing system 210, according to the disclosed embodiments for processing one or more electronic data messages received via a network from sources 102a, 102b, and 102n. Each electronic data message includes a plurality of packets that are generated and transmitted by the sources 102a-102n. Each packet of the plurality of packets is characterized by a sequence, i.e., a sequence number, relative to the others of the plurality of packets of the electronic data message. Each electronic data message may comprise a portion dependent upon an event and a portion that is generated by the source independent of the event. As shown in FIG. 4A, the message processing system 210, which may be part of a receiver 206, includes a network interface 402, a processor 404, a non-transitory memory 406, instructions 408, and a buffer 410. The message processing system 210 may receive electronic data messages from the sources 102a, 102b, and 102n over a network 204a and network infrastructure 212. The electronic data messages including the plurality of packets may be received at the network interface 402 and may be processed by the processor 404 in conjunction with the non-transitory memory 406.

Figure 4B:
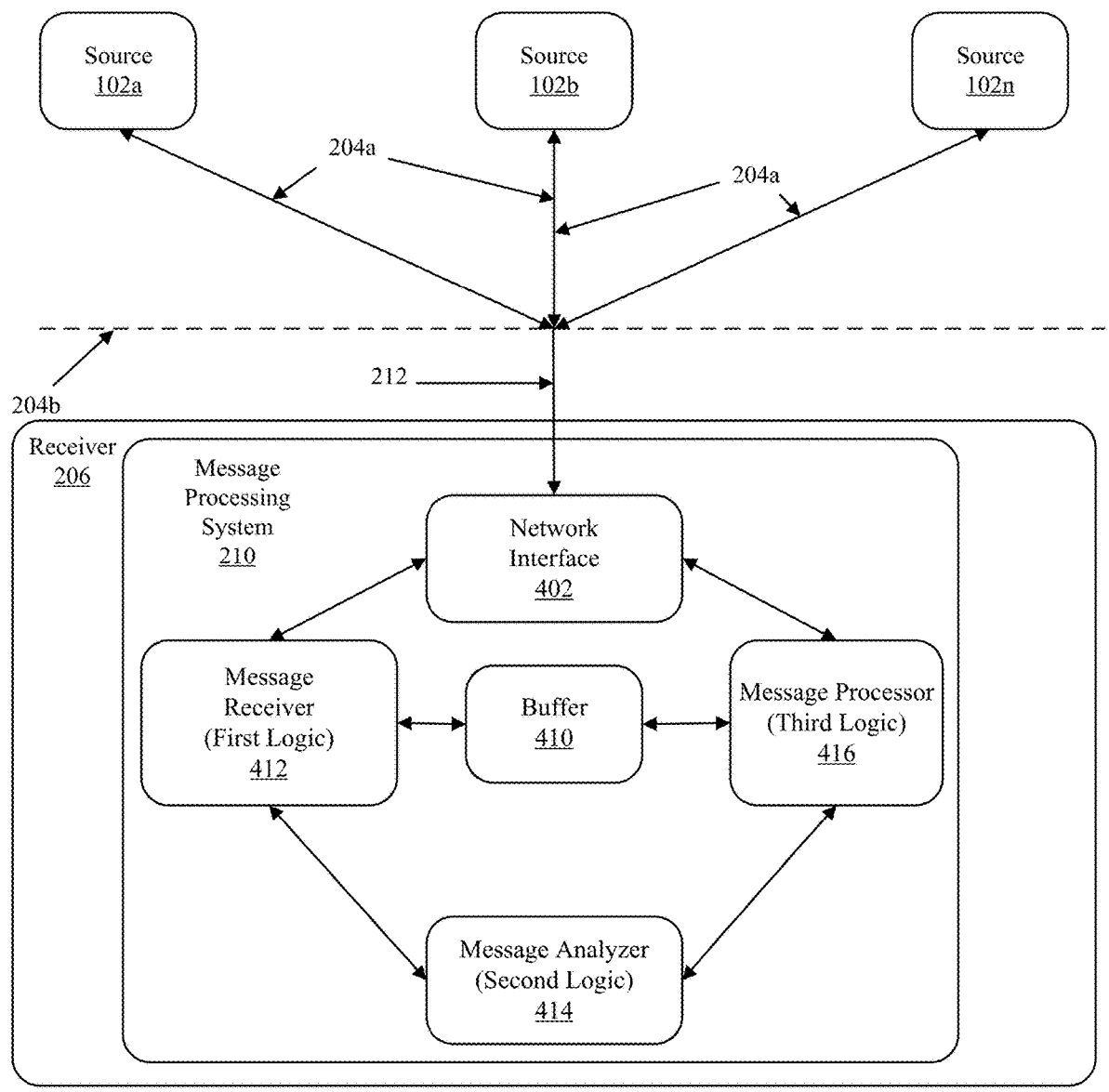
FIG. 4B depicts a functional implementation of the system of FIG. 4A.

FIG. 4B depicts a functional implementation of the system 210 of FIG. 4A. As shown in FIG. 4B, the message processing system 210, which may be part of a receiver 206, includes a network interface 402 connected to a network 204a via a network infrastructure 212, a message receiver 412, a message analyzer 414, a message processor 416, and a buffer 410.

Figure 8:
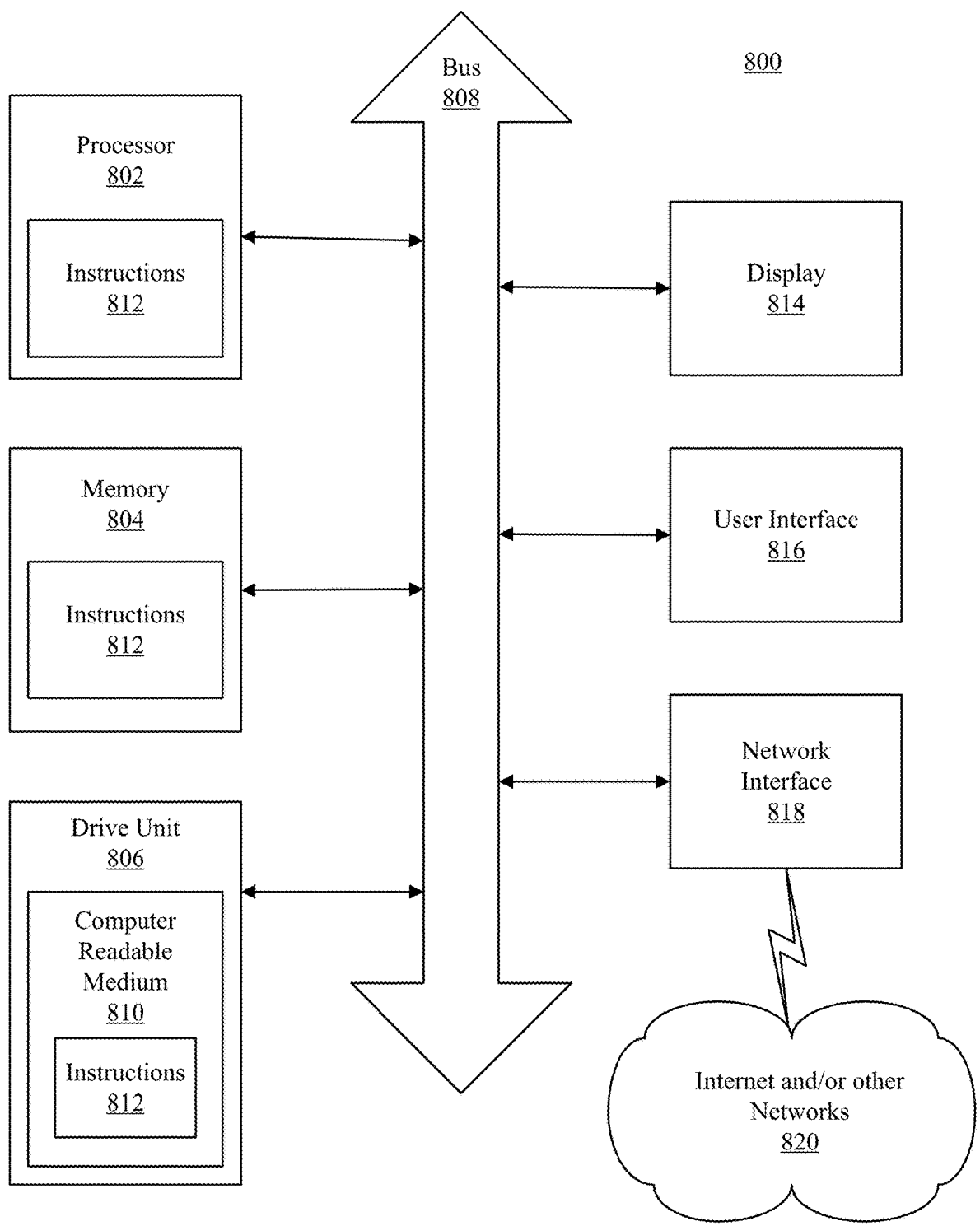
FIG. 8 shows an illustrative embodiment of a general computer system for use with the system of FIGS. 1-7.

The network interface 402, which may comprise the network interface 818 described below with respect to FIG. 8, is operative to couple the message system 210 with a network, such as a public and/or private communications wired and/or wireless network, such as the network 820 shown in FIG. 8 and described in more detail below, and facilitates communications among the message processing system 210 and the participants 102a, 102b, and 102n as described herein. The network interface 402 is operative to receive a subset of the plurality of packets therefrom. The plurality of packets is characterized by a sequence therebetween corresponding to the sequence of the data of the electronic data message. Each packet includes data indicative of the sequence, i.e., a sequence number, of that packet relative to the others of the plurality of packets of the electronic data message. The network interface 402 augments each received packet with a timestamp indicative of the time thereof.

The message receiver 412, which may be implemented by the processor 404 and the non-transitory memory 406 shown in FIG. 4A, or as a separate component or as one or more logic components, such as on an FPGA which may include a memory or reconfigurable component to store logic and a processing component to execute the stored logic, or as first logic 412, e.g., computer program logic, described below, stored in the memory 406, which may be implemented by a memory 804 shown in FIG. 8 and described in more detail below with respect thereto, or other non-transitory computer readable medium, and executable by a processor 404, which may be implemented as a processor 802 shown in FIG. 8 and described in more detail below with respect thereto, to cause the processor 404 to, or otherwise be operative to receive an electronic data message, as described above. The message receiver 412 may be further operative to receive each augmented packet from the network interface 402. For example, the message receiver 412 may include a TCP buffer 410 of the computer which is the destination of each augmented packet.

The message analyzer 414, which may be implemented by the processor 404 and the non-transitory memory 406 shown in FIG. 4A, or as a separate component or as one or more logic components, such as on an FPGA which may include a memory or reconfigurable component to store logic and processing component to execute the stored logic, or as second logic 414, e.g., computer program logic, described below, stored in the non-transitory memory 406, which may be implemented as a memory 804 shown in FIG. 8 and described in more detail below with respect thereto, or other non-transitory computer readable medium, and executable by the processor 404, which may be implemented as a processor 802 shown in FIG. 8 and described in more detail below with respect thereto, to cause the processor 404 to, or otherwise be operative to, automatically analyze the electronic data message to determine if the event independent portion was transmitted by the source prior to occurrence of the event by evaluating whether all of the event independent portion was received prior to any of the event dependent portion. In particular, the message analyzer 414 may automatically analyze the data upon receipt of the electronic data message, e.g., in real time. For example, the message analyzer 414 may use the sequence number of the packets instead of the timestamp to determine whether the packets are out of order. In this example, even though the system may be able to determine out of order packets by looking at each sequence number of each of the packets as they come in without using timestamps, this may be more complicated to implement since it would require keeping track of packets as they come in and continuously testing to see if the most recently received packet is out of order. In another embodiment, the message analyzer 414 may analyze the data at a later time when all of the packets are received to determine if at least one of the received augmented packets was received by the network interface 402 in an order different from the sequence between the plurality of packets by comparing the data indicative of the sequence with the corresponding timestamp of each received augmented packet to determine if the order of receipt of the received augmented packets corresponds to the sequence between the received augmented packets.

More particularly, in a situation where the data message is a TCP data message, or TCP packet, the message analyzer 414 is operative to determine whether each of the received augmented TCP packet was received by the network interface in an order different from the sequence between the plurality of TCP packets by comparing the sequence number of the augmented TCP packet with the corresponding timestamp of each received augmented TCP packet to determine if the order of the of receipt of the received augmented TCP packets corresponds to the sequence between the received augmented packets. For example, in some instances, the source 102a may send packets two through five thousand and withhold packet one until the source 102a receives information about an event before sending packet one. This scenario would involve an optimization relying on the reliability and/or ordering aspects of the TCP protocol, and potentially a violation of business rules of an Exchange if the source 102a is a participant in an electronic trading system. This scenario may involve a source 102 taking advantage of a situation where the software program and/or hardware implementing TCP on the destination computer has been programmed to request only a missing packet in a packet loss situation or where the application layer program is awaiting a validation/checksum value to validate the portion of a message already received. For example, in this scenario, the receiving device may receive packets two through five thousand and then the receiving device may respond as if packet one was lost, thereby requesting packet one be resent from the source 102a. In reality, packet one was not lost and was being withheld by the source 102a. In this situation, after receiving the first packet, the disclosed embodiments determine that the first packet arrived in an order different from the sequence between the plurality of packets. As an alternative to counteract this optimization of packet loss handling, the TCP software/hardware may be programmed to request that a sender resend all of the packets that make up a data message. Additionally, the TCP software/hardware on the destination computer may be programmed so that when the different sequence order of TCP is detected, the source 102a of the optimization may be identified and then how lost packets from that source 102a are handled by the software and/or hardware may be decided; resend only the perceived lost packet, or send all packets when a lost packet is perceived. Additionally, source 102a's TCP implementation could even go so far as to eliminate the retransmit and out of order segment capabilities of TCP and simply tear down any customer TCP connections which produce segments that are not transmitted in order or demonstrate dropped packets either on egress or ingress if a threshold of cumulative invalid transmissions has been exceeded.

The message processor 416, which may be implemented by the processor 404 and the non-transitory memory 406 shown in FIG. 4A, or as a separate component or as one or more logic components, such as on an FPGA which may include a memory or reconfigurable component to store logic and processing component to execute the stored logic, or as third logic 416, e.g., computer program logic, stored in the memory 406, which may be implemented as a memory 804 shown in FIG. 8 and described in more detail below with respect thereto, or other non-transitory computer readable medium, and executable by the processor 404, which may be implemented as a processor 802 shown in FIG. 8 and described in more detail below with respect thereto, to cause the processor 404 to, or otherwise be operative to, when the message analyzer determines that at least one of the received augmented packets of the electronic data message was received by the network interface in an order different from the sequence between the plurality of packets, take an action with respect to the electronic data message.

The action may be applying a time delay to the electronic data message. For example, the message processor 416 may be operative to delay the forwarding of the message to the Exchange, e.g., to the orderer 310 or otherwise cause the orderer 310 to ascribe a later timestamp to the message so as to delay the forwarding of the message as compared to other received messages. The time delay may be a set static value, i.e., between three to five microseconds. Other values for the time delay may be determined. The amount of the time delay may be a dynamic amount. Such delays may be implemented via a storage buffer with a timed release, via a long path such as an appropriate length network path (e.g. physically longer cable), or other known or later developed methods, or combinations thereof, of imparting latency to the transmission of a message via a network.

In an embodiment, the time delay may be implemented by simply adjusting the timestamp/time of receipt accorded to the electronic data message to make it seem as if it were received later than it was. Alternatively, the electronic data message can be delayed by actually holding on to it or buffering it before forwarding. The amount of delay may be a static amount or a dynamic amount.

The message analyzer 414 may be further operative to calculate a minimum size for a complete data message, and further calculate a product of the size and a serialization time for the data message through a particular physical layer. The calculated values may be used by the message processor 416 to add a time delay to the electronic data messages or to the packets thereof, e.g., delay the electronic data message by the calculated amount of time before providing the message to the application, e.g., the orderer 310. In other embodiments, the message analyzer 414 may be further operative to calculate a variance in serialization time for the data message. A variance in serialization time for a data message may be a deviation in the amount of time it takes to transmit a data message from an expected amount of time it takes to transmit a data message. In some embodiments, the message analyzer 414 determines when a source of a data message exceeds a network activity level threshold.

Alternatively, or in addition thereto, the time delay may be computed by the message processor 416 based on variance in transit serialization time from the message source 102a to the message receiver 412. For example, a first message source may be located, logically and/or physically, remotely from the system 210 such that message transmission time there between averages 1 millisecond (ms), while a second message source may be located remotely from the system 210 such that the message transmission time averages 2 ms. Accordingly, an added delay of 0.5 ms would impact the first message source more so than the second message source. Therefore, a more substantial delay may be assigned to the second message source as a calculated delay, where appropriate, so as to have a proportional impact thereon.

In one embodiment, a normalized delay factor may be computed based on the latency of the slowest received data messages over, for example, a particular period of time, e.g. a trading period, whereby an apportioned amount the normalized delay maybe applied to each data message, or completing portion thereof, to normalize the timing thereof with respect to all of the received data messages.

In one embodiment, the message receiver 412 may receive the electronic data message from a network switch. In another embodiment, at least one of the message receiver, message analyzer, or message processor may be implemented using at least one field programmable gate array.

The message processor 416 may be further operative to increment a counter. The counter counts how many electronic data messages have been received from the source 102a wherein the plurality of packets thereof were received in an order different from the sequence of those plurality of packets. The message processor 416 may be further operative to compare the counter to a threshold and disconnect a connection to the network for the source 102a of the data message when the counter exceeds the threshold as determined by the message analyzer 414. For example, the message processing system 210 may keep track of a number of received messages of a particular protocol type (e.g., TCP, Ethernet, iLink 3) from a source over a period of time and determine that the source is abusing the message processing system 210 by sending packets in a different order than the sequence. In some embodiments, the message processor 416 is further operative to add the variance, as calculated by the message analyzer 414, to a time of receipt for the data message. The message processor 416 may transmit the electronic data message to a network switch, a financial market, or a buffer.

In some embodiments the counter may be reset. For example, the counter may be reset after triggering a penalty. In another example, the counter may be reset after the elapse of a period of time, such as hourly, at the end of trading session, and the like. In another example, the counter may be decremented after a period time over which no offending messages were sent, e.g., each hour of no offending activity decrements the counter, etc. In a sense, then the counter could measure a rate of offending activity and penalize the trader when the rate exceeds a threshold. Alternatively, the counter may be a measure of the magnitude of the offending activity.

In some embodiments, taking an action comprises incrementing an activity counter which counts how many electronic data messages have been received from the source 102*a* wherein the packets thereof were received in an order different from the sequence. The action further comprises, comparing the activity counter to a threshold, and, when the counter exceeds the threshold, disconnecting the source permanently or for a defined period of time.

In some embodiments the message receiver 412 is operative to receive heartbeat messages from the source. Heartbeat messages are administrative messages of the electronic trading system used to ensure communications of market events are functioning properly. In order to maintain communications with the electronic trading system, or otherwise maintain the ability to submit transactions, a source may be required to send periodic heartbeat messages to the electronic trading system, such as every 60 seconds, even when sending other transaction messages or only when the source has not sent another transaction message for defined period of time. Taking an action further comprises incrementing the counter when the message analyzer 414 determines that less than all of the plurality of packets comprising a transaction message were received prior to receipt of a heartbeat message. This may be considered an indication that the remaining unreceived packets will not be received, e.g., they were lost in transit or intentionally never sent by the source.

In one embodiment, each electronic data message may comprise data indicative of a message type, at least one message characteristic, and a message payload. In another embodiment, the message type comprises a TCP/IP message. In another embodiment, the message type comprises an iLink 3 message. In another embodiment at least one message characteristic is a size of the electronic data message. In another embodiment, the source 102*a* corresponds to at least one of a plurality of market participants.

Figure 5:
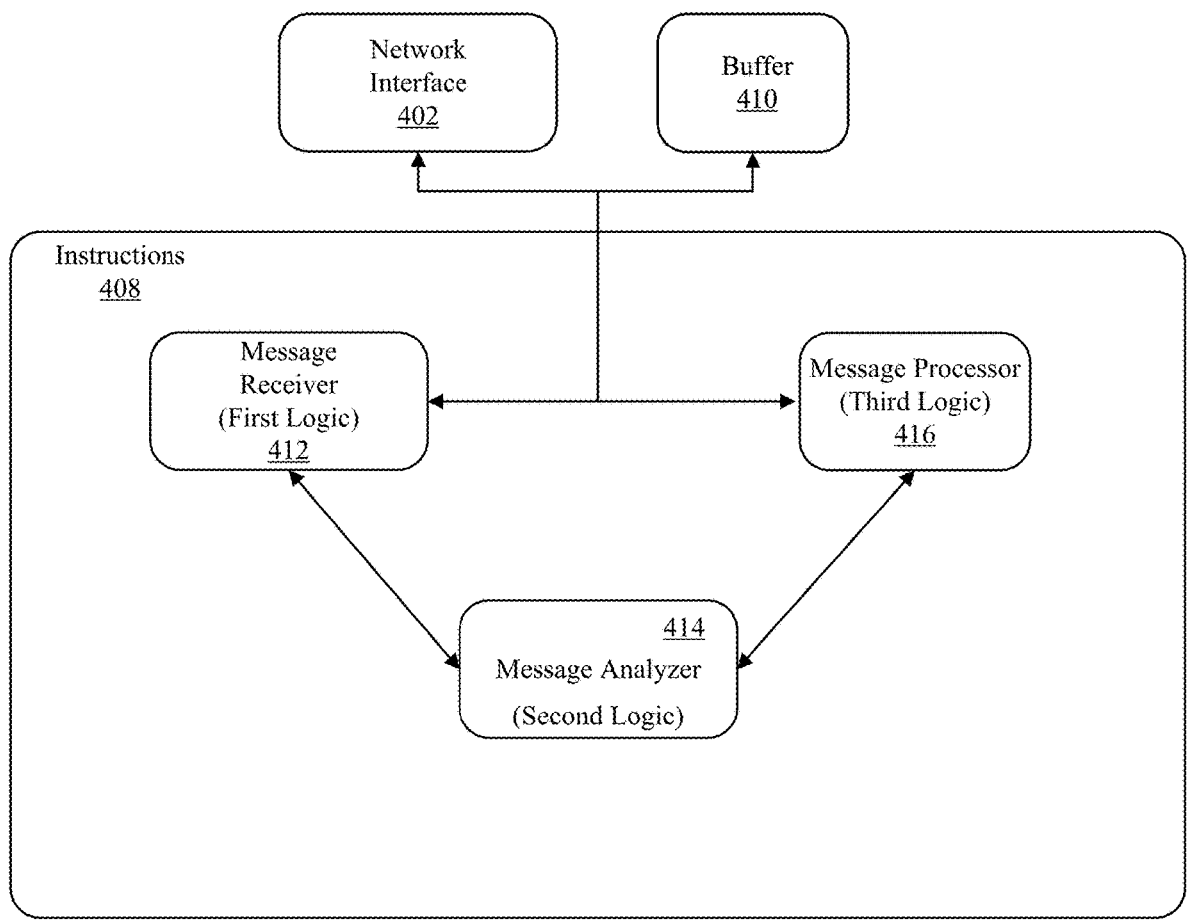
FIG. 5 depicts an illustrative set of instructions for use with the system of FIGS. 1-4B according to one embodiment.

FIG. 5 depicts an illustrative set of computer executable instructions which may be stored in a non-transitory memory and executed by a processor as described herein for use with the systems of FIGS. 1-4B according to one embodiment. The computer-executable instructions 408 may include computer code, such as the instructions 812 disclosed in FIG. 8 below, which implements the functionality of the systems disclosed in FIGS. 1-4B. In particular, the instructions 408, may include logic, or a first logic component, for a message receiver 412, further logic, or a second logic component, for a message analyzer 414, and yet further logic, or a third logic component, for a message processor 416. The instructions may be coupled with the network interface 402, and/or the buffer 410.

A system for processing an electronic data message 210 receives via a network from a source 102*a* an electronic data message comprising a sequence of data, the electronic data message having been transmitted by the source via the network as a plurality of packets characterized by a sequence therebetween corresponding to the sequence of the data of the electronic data message, each packet including data indicative of the sequence of that packet relative to the others of the plurality of packets of the electronic data message. The system 210 includes a network interface 402 coupled with the network and operative to receive at least a subset of the plurality of packets therefrom and augment each received packet with a timestamp upon receipt indicative of the time thereof. The system 210 further includes a non-transitory memory 406 storing computer-executable instructions executable by a processor 404 coupled with the network interface 402 to cause the processor 404 to implement a first logic component 412, a second logic component 414 and a third logic component 416.

The first logic component 412 is coupled with the network interface 402 and is operative to receive each augmented packet from the network interface 402. The second logic component 414 is coupled with the first logic component 412 and is operative to automatically analyze each received augmented packet to determine if at least one of the received augmented packets was received by the network interface in an order different from the sequence between the plurality of packets by comparing the data indicative of the sequence with the corresponding timestamp of each received augmented packet to determine if the order of receipt of the received augmented packets corresponds to the sequence between the received augmented packets. A third logic component 416 is coupled with the second logic component 414 and is operative to, when the second logic component 414 determines that at least one of the received augmented packets of the electronic data message was received by the network interface 402 in an order different from the sequence between the plurality of packets, take an action with respect to the electronic data message.

Figure 6:
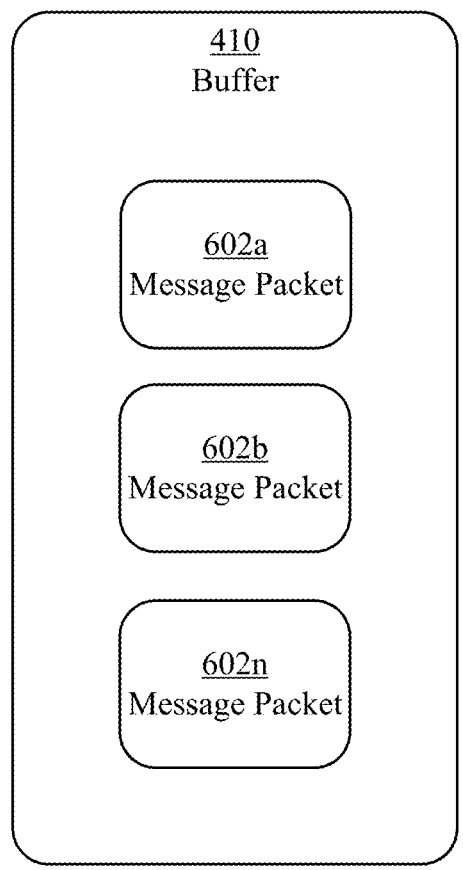
FIG. 6 depicts an illustrative buffer memory for use with the system of FIGS. 1-5 according to one embodiment.

FIG. 6 depicts an illustrative buffer for use with the system of FIGS. 1-5 according to one embodiment. The buffer 410 may be a temporary storage area whose purpose is to act as a holding area for data that is received by the systems of FIGS. 1-5. The buffer 410 may hold data messages that are not yet ready to be processed or transmitted. The buffer 410 may also hold portions or packets 602*a*, 602*b*, . . . , 602*n* of data messages that have been received. The portions of data messages held in the buffer 410 may include portions that are dependent and independent of events, or triggers, that are important to the sources, or market participants. The buffer 410 may be stored in a temporary memory such as Random Access Memory, or any of the memory shown in FIG. 8, such as the memory 804, or computer readable medium 810. More particularly, the buffer 410 may hold portions of TCP data messages, or portions of Ethernet frames, or both. The buffer 410 may be a source of data messages and a destination for data messages or their portions.

One skilled in the art will appreciate that one or more functions/modules described herein may be implemented using, among other things, a logic component such as a reconfigurable logic component, e.g., an FPGA, which may include a logical processing portion coupled with a memory portion, or as a tangible computer-readable medium comprising computer-executable instructions (e.g., executable software code) executable by a processor coupled therewith to implement the function(s). Alternatively, functions/modules may be implemented as software code, firmware code, hardware, and/or a combination of the aforementioned. For example, the functions/modules may be embodied as part of an electronic trading system 208, which may include a message processing system 210, for handling messages related to financial instruments.

Figure 7:
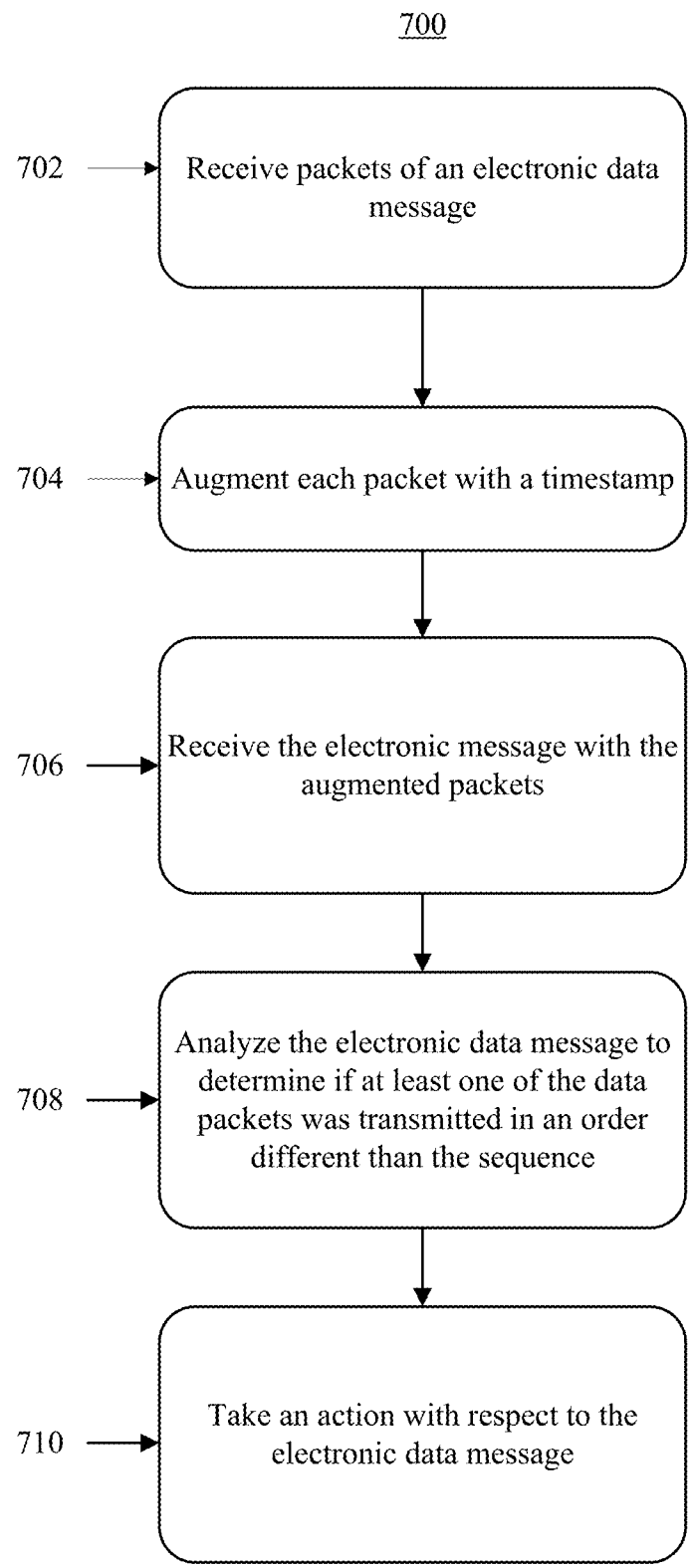
FIG. 7 depicts a flow chart showing operation of the system of FIGS. 1-6 according to one embodiment.

FIG. 7 depicts a flow chart 700 showing operation of the system of FIGS. 1-4B according to one embodiment. In particular, FIG. 7 shows a computer and/or FPGA implemented method for processing a plurality of messages received via a network, such as the network 820 of FIG. 8, from a plurality of sources 102a . . . n, the processing of each transaction operative to process one or more data messages received via a network from a source. The electronic data message includes a sequence of data. The electronic data message is transmitted by the source via the network as a plurality of packets characterized by a sequence therebetween corresponding to the sequence of the data of the electronic data message. Each packet includes data indicative of the sequence of that packet relative to the others of the plurality of packets of the electronic data message.

In one embodiment, each data message may comprise data indicative of a message type, at least one message characteristic, and a message payload. In another embodiment, each packet of the received electronic data message includes the data indicative of the sequence and a time of receipt affixed by the network interface which are used by the message analyzer to determine the order of the received packets of the data message. The source may correspond to at least one of a plurality of market participants. Similarly, the message type may be a TCP/IP packet, an iLink 3 message, or an Ethernet frame. In some embodiments, the data message received may be an incomplete data message and the at least one message characteristic of the data message includes a level of completeness for the data message. Similarly, in some embodiments, the incomplete data message has data indicative of fields that comprise the data message, and the level of completeness includes data indicators indicating which fields of the incomplete data message contain data. The data fields of the data message may correspond to the fields used in the TCP, IP, Ethernet, or iLink 3 protocols. The data indicators may indicate when data is in each field, and what data is located in each field.

The flowchart 700 includes receiving, by a network interface 402 coupled with the network, a data message, i.e., an electronic data message, comprising a plurality of packets (Block 702). The data message may be received from a network switch, from a source or market participant, or from a buffer of incomplete data messages, such as the buffer 410.

The flowchart 700 further includes augmenting, by the network interface 402, each received packet with a timestamp upon receipt indicative of the time thereof (Block 704). The timestamp represents the time of receipt of each augmented packet by the network interface 402.

The flowchart 700 further includes receiving, by a message receiver 412 from the network interface 402, each augmented packet (Block 706).

The flowchart 700 further includes automatically analyzing, by the message analyzer 414, coupled with the message receiver 412, such as via the communications infrastructure 302 of FIG. 3A or 3B or the network interface 402 of FIGS. 4A and 4B, the electronic data message to determine if at least one of the received augmented packets was received by the network interface 402 in an order different from the sequence between the plurality of packets by comparing the data indicative of the sequence with the corresponding timestamp of each received augmented packet to determine if the order of receipt of the received augmented packets corresponds to the sequence between the received augmented packet (Block 708). The analyzing of the data message may include calculating a size for the data message, calculating a product of the size and a serialization time for the data message. In other embodiments, the analyzing may include calculating a variance in serialization time for the data message. In still more embodiments, the analyzing determines when a source of a data message exceeds a threshold.

The flowchart 700 further includes taking action, by a message processor 416, coupled with the message analyzer 412, such as via the communications infrastructure 302 of FIG. 3A or 3B or the network interface 402 of FIGS. 4A and 4B, when the message analyzer 412 determines that at least one of the received augmented packets of the electronic data message was received by the network interface 402 in an order different from the sequence between the plurality of packets, take an action with respect to the electronic data message (Block 710). In some embodiments, taking an action with respect to a data message further comprises applying a delay to the data message as described above. The delay may include delaying forwarding the electronic data message. Delaying forwarding may comprise delaying the forwarding of the electronic data message based on the serialization of the data message, i.e., how long it takes the data message to be transmitted. The delay may be computed based on a size of the data message, calculating a product of the size and a serialization time for the data message, and the message processor being further operative to add the product to a time of receipt for the data message. Serialization time for the data message may be the amount of time it takes for the data message to be transmitted across a network based on the data message. For example, a delay dependent on the size of the data message, which would equal the time it would take to submit the data message on the lowest bandwidth infrastructure component between participant and gateway. For example; if participants connect via a 10 Gb connection and a buffer contains 200 bytes, the delay would be (200 bytes×approximately 1 nanosecond serialization time per byte on 10 Gb=approximately 200 nanoseconds). A meaningful delay may be dependent on the variance of the network transport time. For example, a delay of one millisecond could be added, which for co-located machines with usual latencies of <1-10 microseconds, should more than offset any benefit resulting in splitting order traffic.

In some embodiments, taking an action may comprise incrementing a counter operative to count how many electronic data messages have been received from the source wherein the plurality of packets thereof were received in an order different from the sequence of those plurality of packets. The message processor 416 may be further operative to compare the counter to a threshold, and, when the counter exceeds the threshold, the message processor 416 may disconnect the source.

In some embodiments, the comparing to the threshold may take place before the activity counter is incremented or after.

In some embodiments the message receiver 412 may be operative to receive periodic heartbeat messages from the source. Taking an action may include incrementing the counter when the message analyzer 414 determines that less than all of the plurality of packets was received prior to receipt of a heartbeat message.

Similarly, taking action with respect to a data message may further comprise transmitting the data message to a network switch, a financial market, or a buffer subsequent to taking the action.

Referring to FIG. 8, an illustrative embodiment of a general computer system 800 is shown. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices. Any of the components of the electronic trading system 208 discussed above may be a computer system 800 or a component in the computer system 800. The computer system 800 may implement a match engine, margin processing, payment or clearing function on behalf of an exchange, such as the Chicago Mercantile Exchange, of which the disclosed embodiments are a component thereof.

In a networked deployment, the computer system 800 may operate in the capacity of a server or as a client user computer in a client-server user network environment, as a peer computer system in a peer-to-peer (or distributed) network environment, or as a network device such as a switch, gateway or router. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 804 may be a memory component of a reconfigurable logic device, e.g. an FPGA. In one embodiment, the memory 804 includes a cache or random access memory for the processor 802. In alternative embodiments, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the programmed processor 802 executing the instructions 812 stored in the memory 804. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 800 may further include a display unit 814, such as a liquid crystal display (LCD), an organic light emitting diode (OLED), a flat panel display, a solid state display, a cathode ray tube (CRT), a projector, a printer or other now known or later developed display device for outputting determined information. The display 814 may act as an interface for the user to see the functioning of the processor 802, or specifically as an interface with the software stored in the memory 804 or in the drive unit 806.

Additionally, the computer system 800 may include an input device 816 configured to allow a user to interact with any of the components of system 800. The input device 816 may be a number pad, a keyboard, or a cursor control device, such as a mouse, or a joystick, touch screen display, remote control or any other device operative to interact with the system 800.

In a particular embodiment, as depicted in FIG. 8, the computer system 800 may also include a disk or optical drive unit 806. The disk drive unit 806 may include a computer-readable medium 810 in which one or more sets of instructions 812, e.g. software, can be embedded. Further, the instructions 812 may embody one or more of the methods or logic as described herein. In a particular embodiment, the instructions 812 may reside completely, or at least partially, within the memory 804 and/or within the processor 802 during execution by the computer system 800. The memory 804 and the processor 802 also may include computer-readable media as discussed above.

The present disclosure contemplates a computer-readable medium that includes instructions 812 or receives and executes instructions 812 responsive to a propagated signal, so that a device connected to a network 820 can communicate voice, video, audio, images or any other data over the network 820. Further, the instructions 812 may be transmitted or received over the network 820 via a communication interface 818. The communication interface 818 may be a part of the processor 802 or may be a separate component. The communication interface 818 may be created in software or may be a physical connection in hardware. The communication interface 818 is configured to connect with a network 820, external media, the display 814, or any other components in system 800, or combinations thereof. The connection with the network 820 may be a physical connection, such as a wired Ethernet connection or may be established wirelessly as discussed below. Likewise, the additional connections with other components of the system 800 may be physical connections or may be established wirelessly.

The network 820 may include wired networks, wireless networks, or combinations thereof or other device to device interconnection which facilitate the exchange of data there between. The wireless network may be a cellular telephone network, an 802.11, 802.16, 802.20, or WiMax network. Further, the network 820 may be a public network, such as the Internet, a private network, such as an intranet, or combinations thereof, and may utilize a variety of networking protocols now available or later developed including, but not limited to TCP/IP based networking protocols. The network 820 may further include node-to-node interconnections between computing nodes in a multi-processor computing environment and/or processor interconnections between multiple processing cores of a multi-core processor, such as may be used in either a system-on-chip (SOC) or network-on-chip (NoC) implementation.

Figure 10:
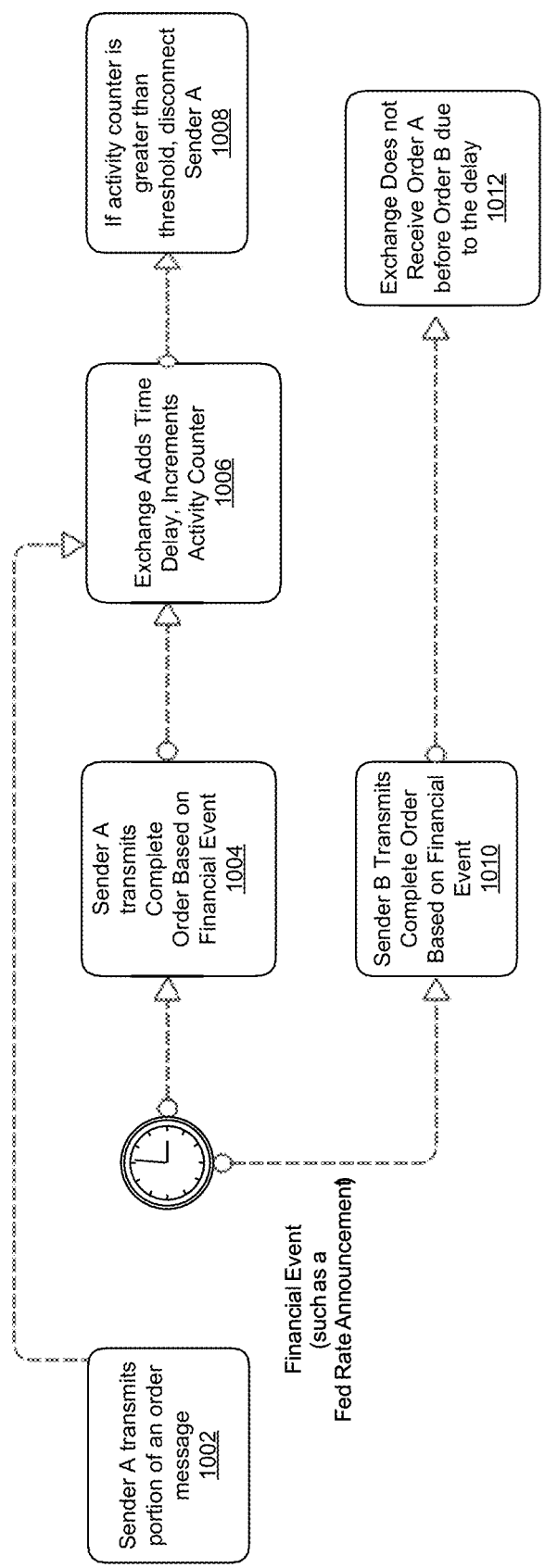
FIG. 10 depicts an example scenario with the disclosed embodiments applied.

FIG. 10 depicts an example scenario with the disclosed embodiments applied. In one embodiment, the message processing system 210 is applied to monitor and process orders submitted by Trader Sender A and Trader Sender B. The message processing system 210 includes a network interface 402 and an MSGW coupled with the network. The MSGW may be implemented by a processor coupled with a non-transitory memory storing computer-executable instructions. As shown in FIG. 10, Trader Sender B has knowledge of the occurrence of an event, and follows the process described above to create and submit one or more orders to trade based thereon (Block 1010). Prior to the occurrence of the event, Trader Sender A uses the TCP retransmission technique and manipulates the TCP protocol to generate, one or more TCP packets and transmit at least some of those packets first before the event occurs as shown in FIG. 10 (Block 1002). Those packets may be constructed to appear, based on the sequencing data as if they were constructed based on the entire iLink 3 message when, in fact they were not. The network interface 402 of the message processing system 210 receives the packets and augments a timestamp to the packets. Once the event occurs and any event dependent order data is determined, the TCP software of Trader Sender A is directed to generate one or more TCP packets comprising the event dependent data and transmit those packets to complete the iLink 3 message, the late arriving packets merely appearing to the receiving device as having been delayed in transit (Block 1004). As compared to the overall size of the iLink 3 message, these remaining TCP packets comprise a smaller amount of data and therefore take less time to transmit. Accordingly, relative to the time of the occurrence of the event, the Trader Sender A, is sending less post-event data to the Exchange and therefore is able to send that data faster than the order of Sender B as shown in FIG. 10. The network interface 402 augments a timestamp to the packets containing the dependent data to complete the order from Trader Sender A. As stated above, since Trader Sender A is sending less port-event data, the network interface 402 receives the order from Trader Sender A before the order from Trader Sender B. When the message from Trader Sender A is complete, the network interface 402 forwards the message from Trader Sender A to the MSGW. The network interface 402 receives the packet for Sender B and augments a timestamp to the packets. The MSGW does not analyze whether the independent portion of the message was transmitted by the source prior to the event. Instead, the MSGW analyzes the electronic data message from Trader Sender A to determine if at least one of the packets arrived in a different order from the sequence by comparing the sequence number with the corresponding timestamp of each packet to determine if the order of the timestamp corresponds to the sequence. Since the timestamps do not correspond to the sequence, the MSGW concludes that the message from Trader Sender A was delayed. The MSGW may apply a time delay, for example, between 3-5 microseconds. The MSGW delays forwarding the message from Trader Sender A and adds the time delay to a time of receipt for the data message (Block 1006). The MSGW may increment an activity counter relating to Trader Sender A. The MSGW compares the activity counter to a threshold. If the activity exceeds the threshold, the MSGW disconnects the source (Block 1008). The MSGW receives and analyzes the electronic data message from Trader Sender B, determines that the order corresponds to the sequence and forwards the message. In one embodiment, the MSGW may forward the message from Trader Sender B before forwarding the delayed message from Trader Sender A. Further, Trader Sender B's time of receipt may be earlier than the time of receipt of Trader Sender A after the time delay is applied (Block 1012).

Figure 11:
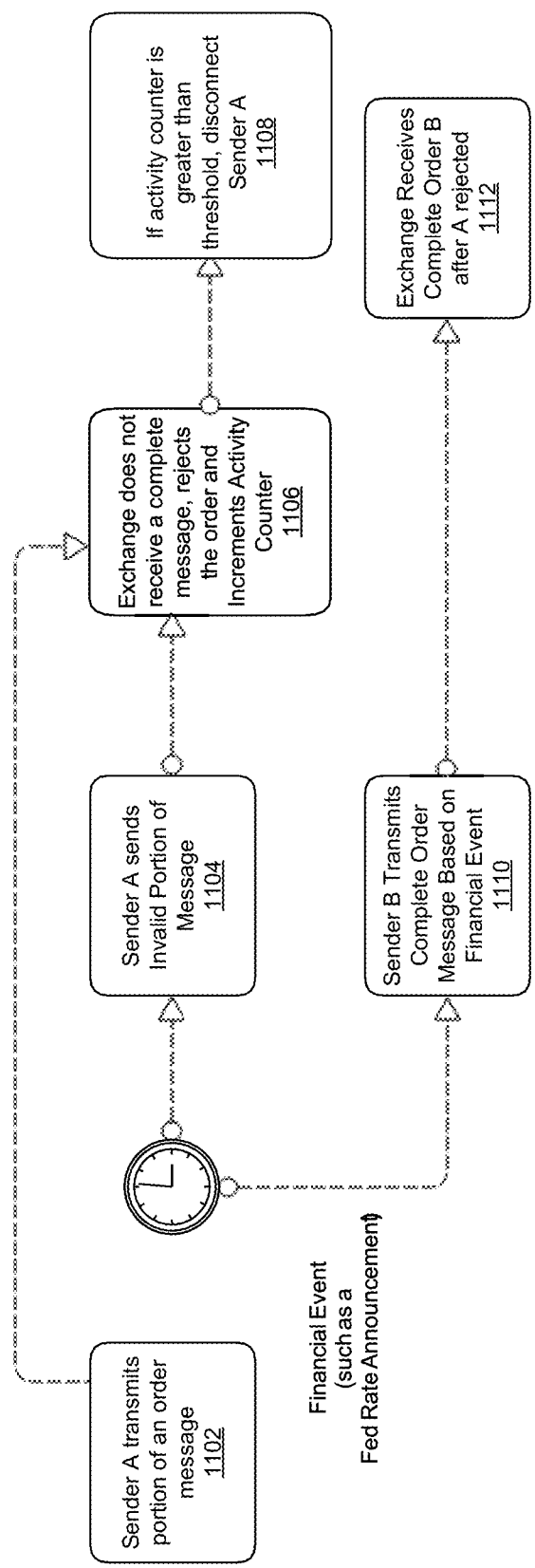
FIG. 11 depicts an example scenario with the disclosed embodiments applied.

FIG. 11 depicts another example scenario with the disclosed embodiments applied. In another embodiment, the message processing system 210 is applied to process orders submitted by Trader Sender A and Trader Sender B. The message processing system 210 includes a network interface 402 and an MSGW coupled with the network. The network interface 402 is operative to receive the electronic data message comprising the plurality of packets. The MSGW is further operative to receive heartbeat messages from Trader Sender A and Trader Sender B. As stated above, heartbeat messages indicate an administrative message of the electronic trading system used to ensure communications of market events are functioning properly. As shown in FIG. 11, Trader Sender B has knowledge of the occurrence of an event, and follows the process described above to create and submit one or more orders to trade based thereon (Block 1110). Prior to the occurrence of the event, Trader Sender A uses the TCP retransmission technique and manipulates the TCP protocol to generate, one or more TCP packets and transmit at least some of those packets first before the event occurs as shown in FIG. 10 (Block 1102). The network interface 402 of the message processing system 210 receives the packets and augments a timestamp to each packet. Once the event occurs and any event dependent order data is determined, the TCP software of Trader Sender A may decide that the message is not wanted. Trader Sender A then transmits a corrupt message (Block 1104). Since the message of Trader Sender A is corrupt, the message does not reach the MSGW. The MSGW determines that a packet of the plurality of packets was not received when the packet does not arrive before the next heartbeat message is received from the source. The MSGW may increment an activity counter relating to Trader Sender A (Block 1106). The MSGW compares the activity counter to a threshold. If the activity exceeds the threshold, the MSGW disconnects the source (Block 1108). The MSGW receives and analyzes the electronic data message from Trader Sender B, determines that the order corresponds to the sequence and forwards the message (Block 112).

Figure 12:
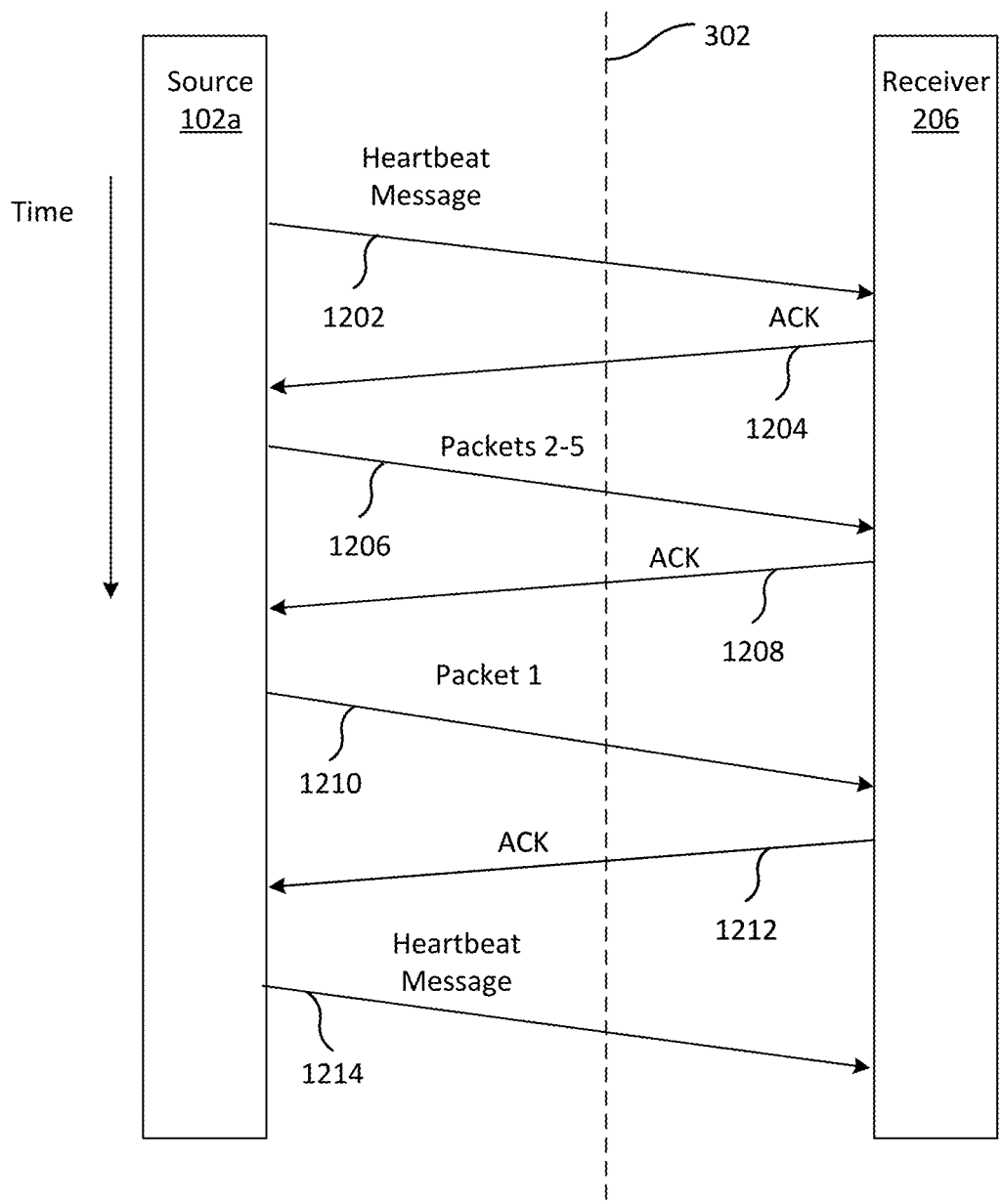
FIG. 12 depicts a time sequence diagram showing transmissions of messages between a source and a receiver with the disclosed embodiments applied.

FIG. 12 depicts a time sequence diagram showing transmissions of messages between a source 102*a* and a receiver 206 according to an embodiment. In this embodiment, source 102*a* transmits a heartbeat message 1202 to the receiver 206. The receiver 206 transmits an acknowledgment message 1204 to the source 102*a*. Prior to the occurrence of an event, source 102*a* uses the TCP retransmission technique and manipulates the TCP protocol to generate TCP packets 2-5. The source 102*a* transmits a data message 1206 containing packets 2-5 before the event occurs. The receiver 206 receives the data message 1206 and transmits an acknowledgement message 1208. The receiver 206 with the processing system 210 augments a timestamp to each packet. Once the event occurs and any event dependent order data is determined, the TCP software of source 102*a* is directed to generate packet 1 comprising the event dependent data and transmit message 1210 with packet 1 to complete the message. The network interface 402 augments a timestamp to packet 1 containing the dependent data to complete the order from source 102*a*. Since the message from source 102*a* is complete and the next heartbeat message 1214 has not been received, the receiver 206 analyzes the electronic data message from source 102*a* to determine if at least one of the packets arrived in a different order from the sequence by comparing the sequence number with the corresponding timestamp of each packet to determine if the order of the timestamp corresponds to the sequence. Since the timestamps do not correspond to the sequence, the receiver 206 concludes that the message from source 102*a* was delayed. The receiver 206 may apply a time delay, for example, between 3-5 microseconds. The receiver 206 may delay forwarding the message from source 102*a* and may add the time delay to a time of receipt for the data message. The receiver 206 may increment an activity counter relating to source 102*a*. The receiver 206 compares the activity counter to a threshold. If the activity exceeds the threshold, the receiver 206 disconnects the source. The receiver 206 may send an acknowledgement message 1212 including information regarding the added delay to the source 102*a*. The source 102*a* transmits a heartbeat message 1214.

Figure 13:
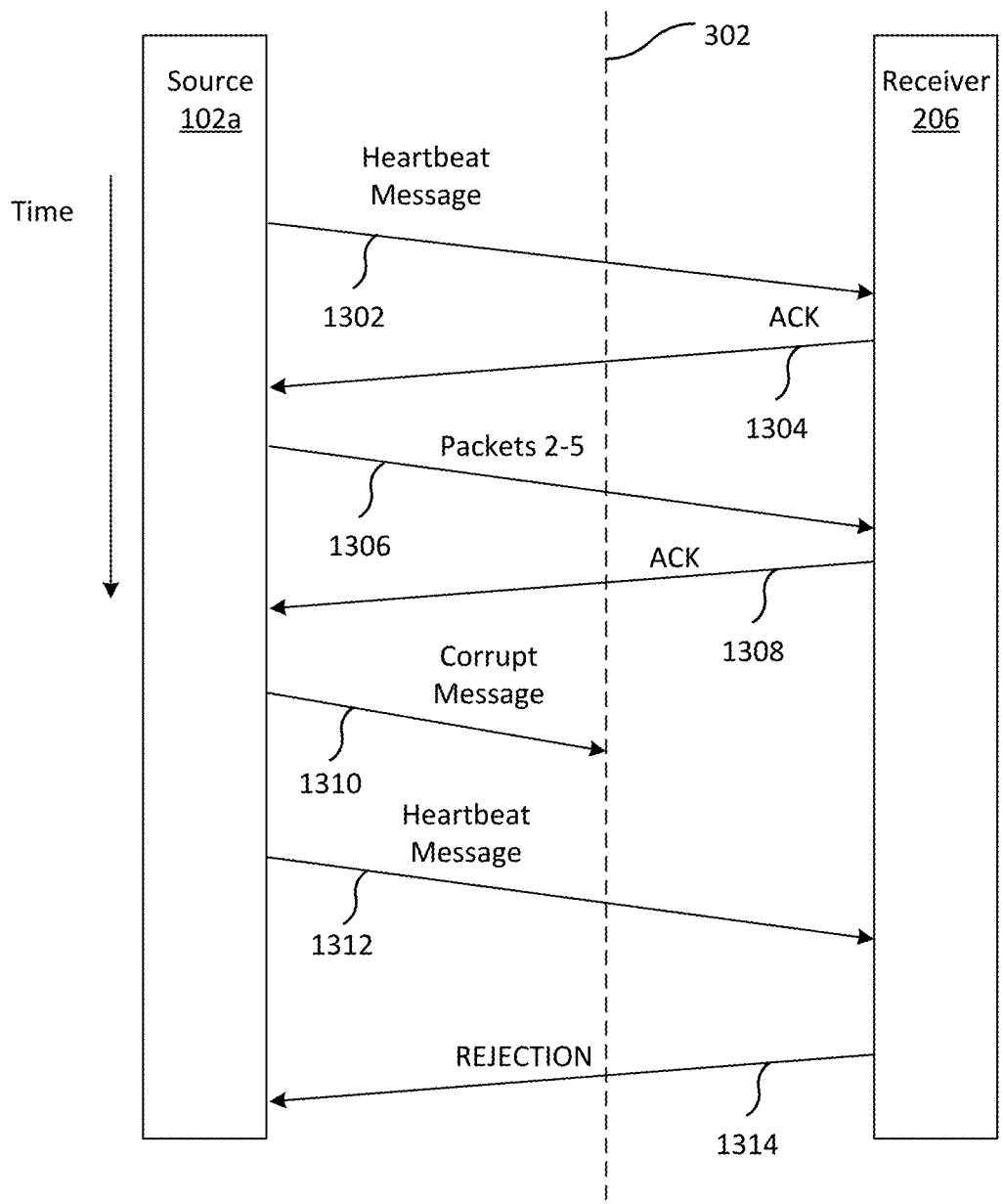
FIG. 13 depicts a time sequence diagram showing transmissions of messages between a source and a receiver with the disclosed embodiments applied.

FIG. 13 depicts a time sequence diagram showing transmissions of messages between a source 102*a* and a receiver 206 according to an embodiment. In this embodiment, the source 102*a* transmits a heartbeat message 1302 to the receiver 206. The receiver 206 transmits an acknowledgment message 1304 to the source 102*a*. Prior to the occurrence of an event, source 102*a* uses the TCP retransmission protocol and manipulates the TCP protocol to generate TCP packets 2-5. The source 102*a* transmits a data message 1306 containing packets 2-5 before the event occurs. The receiver 206 receives the data message 1206 and transmits an acknowledgement message 1308. The receiver 206 with the processing system 210 augments a timestamp to each packet. Once the event occurs and any event dependent order data is determined, the TCP software of source 102*a* may decide that the message is not wanted. Source 102*a* transmits a corrupt message 1310. Since the message 1310 of source 102*a* is corrupt, the message is handled by the physical network layer 302 and it does not reach the receiver 206. The source 102*a* sends a heartbeat message 1312. The receiver 206 determines that a packet of the plurality of packets was not received when packet 1 does not arrive before the heartbeat message 1312 is received from the source 102*a*. The receiver 1314 may send a rejection message 1314 to the source 102*a*. The receiver 206 may increment an activity counter relating to the source 102*a*. The receiver 206 compares the activity counter to a threshold. If the activity exceeds the threshold, the receiver 206 disconnects the source 102*a*.

Figure 14:
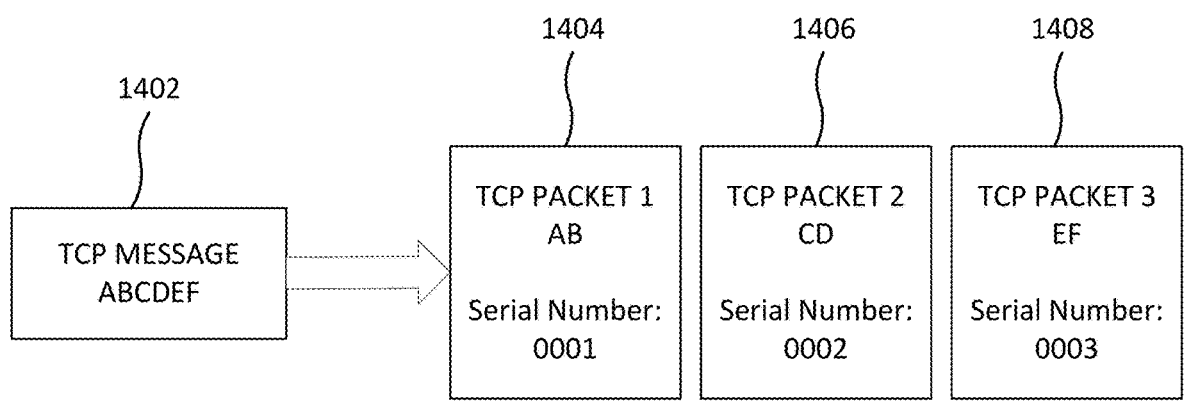
FIG. 14 depicts an illustrative TCP message for processing according to an embodiment.

FIG. 14 depicts a plurality of TCP packets of an electronic data message. At the most basic level, the sequence of the packets created by TCP for a given message are in the same order that bits/bytes of that message were given to the TCP layer by the Application/Application layer. If the application layer gives the TCP layer the message ABCDEF 1402, then TCP may break it down into packets 1(AB) 1404, 2(CD) 1406 and 3(EF) 1408. The TCP message ABCDEF is a trade order formatted according to a protocol (iLink 3). The iLink 3 protocol defines the semantic, i.e., the rules, for what iLink 3-formatted trade order needs to look like. For example, A is the price, B is the quantity they want to trade, C is buy or sell, D is the product they want to trade, E is the trader ID, and F is another parameter. The TCP layer will break up a trade order into packets in accordance with the ordering defined by the iLink 3 protocol. That way, when the message is reassembled at the receiver and handed to an iLink 3 enabled receiving application, that application may understand the message. In this example, packet AB is assigned a serial number of 0001, packet CD is assigned a serial number of 0002 and packet EF is assigned a serial number of 0003.

Figure 15:
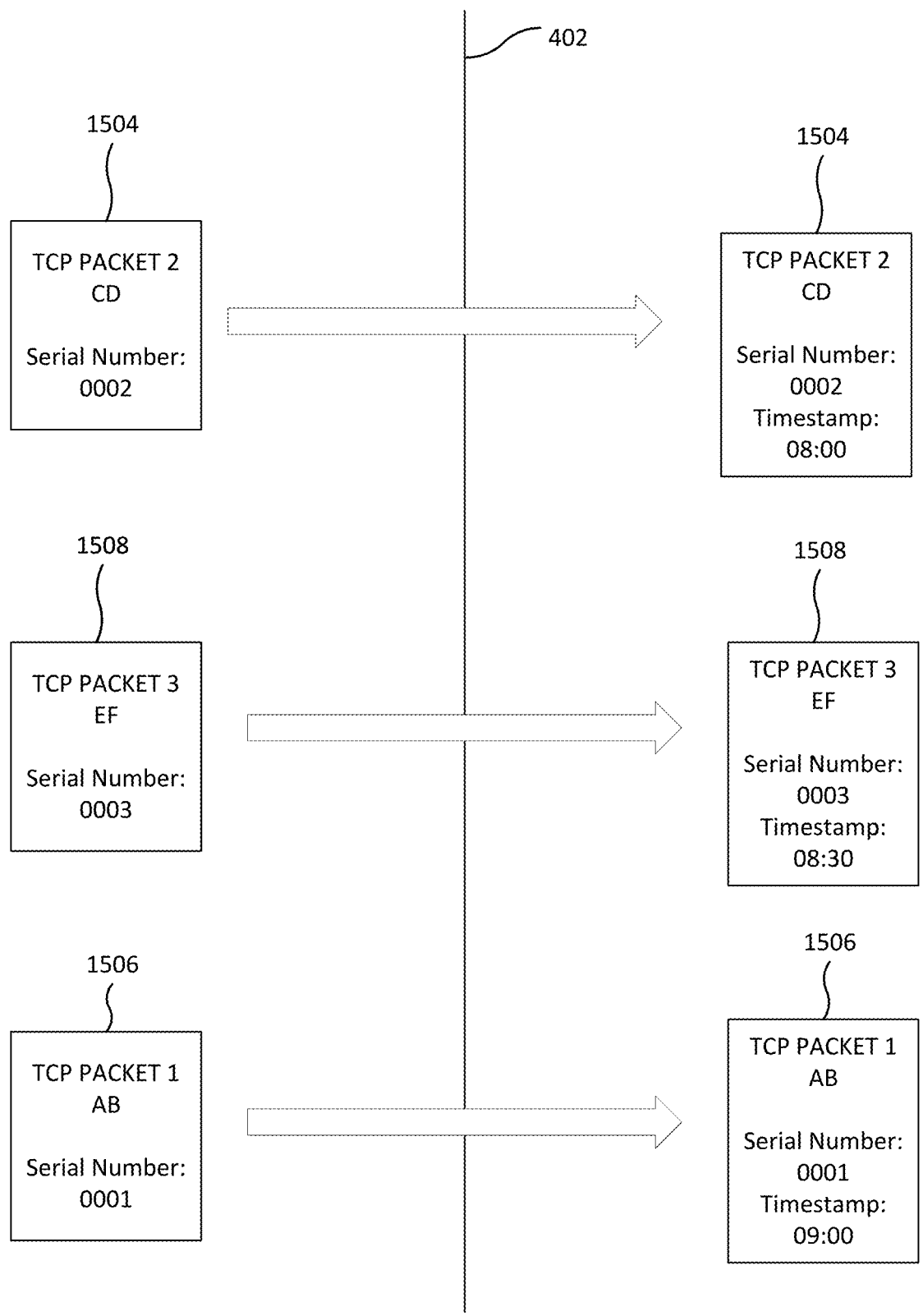
FIG. 15 depicts the illustrative TCP packets of the TCP message of FIG. 14 for processing with the disclosed embodiments applied.

FIG. 15 depicts the plurality of packets of FIG. 14 being processed by the processing system 210 according to an embodiment. As stated above, the processing system 210 includes a network interface 402, a message receiver 412, a message analyzer 414, and a message processor 416. Prior to the occurrence of an event, source 102*a* uses the TCP retransmission technique and manipulates the TCP protocol to generate TCP packets 2 and 3. The source 102*a* transmits packets 2 and 3 before the event occurs. The network interface 402 receives packets 2 and 3. The network interface 402 augments the 08:00 timestamp to packet 2 and the 08:30 timestamp to packet 3. Once the event occurs and any event dependent order data is determined, the TCP software of source 102*a* is directed to generate and transmit packet 1 comprising the event dependent data AB to complete the message. The network interface 402 receives packet 1 and augments the timestamp 09:00 to packet 1 containing the dependent data to complete the order from source 102*a*. Once the complete message is received, the message analyzer 414 analyzes the electronic data message from source 102*a* to determine if at least one of the packets arrived in a different order from the sequence by comparing the sequence number with the corresponding timestamp of each packet to determine if the order of the timestamp corresponds to the sequence.

For example, the message analyzer may order the packets by serial number to be analyzed. In this case, the message analyzer first analyzes TCP Packet 1 with the serial number 0001 and with the timestamp 09:00 and compares it with TCP Packet 2 with serial number 0002 and with timestamp 08:00. Since the timestamp of Packet 2 do not correspond to the sequence, the message analyzer 414 concludes that the Packet 1 from source 102*a* was delayed.

In another example, the message analyzer may order the packets by the timestamp (indicating the time of receipt by the network interface 402) to be analyzed. In this case, the message analyzer first analyzes TCP Packet 2 with timestamp 08:00 and with serial number 0002 and compares it with TCP Packet 3 with timestamp 08:30 and with serial number 0003. Since the timestamp corresponds to the serial number sequence, the message analyzer proceeds to compare TCP Packet 3 with TCP Packet 1 with serial number 0001 and with timestamp 09:00. Since the timestamp of Packet 1 does not correspond to the sequence (serial number 0004 is expected), the message analyzer 414 concludes that the Packet 1 from source 102*a* was delayed.

The message processor 416 may apply a time delay, for example, between 3-5 microseconds. The message processor 416 may delay forwarding the message from source 102a and may add the time delay to a time of receipt for the data message.

With electronic trading systems which may utilize GPS or other time synchronization receivers which utilize PTP or PPS or similar to sync the "absolute time" to one or more switches, orderers, gateways, the disclosed embodiments may: ensure when doing time synchronization that time cannot go backwards to prevent previous later packet from being pulled into application earlier than earlier packet if time sync occurred after first packet but before second packet which indicated that the clock was "too far ahead" and now needed to slow down or halt incrementing temporarily; mitigate GPS spoofing to alter time and trigger the above (for example if time is far off but cannot go negative, what if multiple packets get same timestamp while time is prevented from going forward); need separate non-synced timestamp that is based off a monotonically increasing counter clocked off of the recovered network clock and always monotonically increasing; provide two timestamps, one which is synced to "absolute time" and a second which is just a monotonically increasing clock specifically recovered from the RX of the Ethernet link. This way it preserves the interpacket gap between messages to detect queuing, know which packets arrived first, etc.

In one embodiment, the electronic trading system may: provide a clock output to actually drive customers transmitting logic (to prevent customers from attempting to overclock or arbitrage exact clock frequencies of individual network links or switches); may Ethernet-level padding of frames may be utilized (or simply holding on to them at FPGA for a calculated amount of time) to ensure that differently formatted frames (at the various protocol levels) doing the same business-level operation (sending a buy order) have consistent latency (regardless of usage of optional IP or TCP extensions or utilization or non-utilization of optional iLink 3 headers, longer length of variable length fields, etc.).

First network hop on the exchange's side which is directly connected to the customer could inject timestamp of SOF (start of frame) and then provide that upstream to orderer so that packets of trivially smaller size are not given an advantage if they started being sent at exactly the same time as packets of slightly larger size (especially true if all packets being sent upstream in parallel via cut through switching or similar).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
   a processor and a memory coupled therewith, the memory storing computer-executable instructions that when executed by the processor, causes the processor to:
   receive a plurality of packets of an electronic data message from a source via a network for processing by the processor, each packet of the plurality of packets including either event dependent or event independent data and further characterized by data indicative of a sequence of that packet relative to others of the plurality of packets of the electronic data message;
   augment each received packet with a timestamp upon receipt indicative of a time thereof; and
   determine, without regard as to whether any of the plurality of packets includes event dependent or event independent data, that at least one of the received augmented packets was received in an order different from the sequence between the plurality of packets by comparing the data indicative of the sequence with the corresponding timestamp of each received augmented packet to determine if the order of receipt of the received augmented packets corresponds to the sequence between the received augmented packets, and
   based on the determination, delay processing of the electronic data message.

2. The system of claim 1, wherein the processor does not distinguish between inadvertent and intentionally optimistic messaging behavior by the source.

3. The system of claim 1, wherein the processor does not distinguish between inadvertent and intentional reordering of the sequence of the plurality of packets by the source.

4. The system of claim 1, wherein the processing of the electronic data message comprises forwarding the electronic data message to a destination, the processor being further operative to:
   delay forwarding the electronic data message by a time delay, and
   adjust a time of receipt accorded to the electronic data message based on the time delay.

5. The system of claim 1, wherein the processing of the electronic data message comprises forwarding the electronic data message to a destination, the processor being further operative to:
   delay forwarding the electronic data message by a time delay, the time delay being computed based on a size for the electronic data message by calculating a product of the size and a serialization time for the electronic data message; and
   adjust a time of receipt accorded to the electronic data message based on the product.

6. The system of claim 1, wherein the processing of the electronic data message comprises forwarding the electronic data message to a destination, the processor being further operative to:
   delay forwarding the electronic data message by a time delay, the time delay being computed based on a variance in serialization time for the electronic data message; and
   adjust a time of receipt accorded to the electronic data message based on the variance.

7. The system of claim 1, wherein the processor is implemented using a field programmable gate array.

8. The system of claim 1, wherein when the plurality of packets are received in an order different from the sequence of those plurality of packets, the processor is further operative to:
   increment a counter operative to count how many electronic data messages have been received from the source;
   compare the counter to a threshold; and
   when the counter exceeds the threshold, disconnect the source.

9. The system of claim 8, wherein the processor is further operative to:
   receive periodic heartbeat messages from the source, and increment the counter when the processor determines that less than all of the plurality of packets were received prior to receipt of a heartbeat message of the periodic heartbeat messages.

10. The system of claim 1, wherein the electronic data message comprises data indicative of a message type, at least one message characteristic, and a message payload.

11. The system of claim 10, wherein the message type comprises a TCP/IP message or an iLink 3 message.

12. The system of claim 10, wherein the at least one message characteristic is a size of the electronic data message.

13. The system of claim 1, wherein the source corresponds to at least one of a plurality of market participants.

14. The system of claim 1, wherein the processing of the electronic data message comprises forwarding the electronic data message to a network switch, a financial market, or a buffer.

15. A computer implemented method comprising:
   receiving, by a processor, from a source via a network, a plurality of packets of an electronic data message for processing by the processor, each packet of the plurality of packets including either event dependent or event independent data and further characterized by data indicative of a sequence of that packet relative to others of the plurality of packets of the electronic data message;

augmenting, by the processor, each received packet with a timestamp upon receipt indicative of the time thereof;

determining, by the processor, without regard as to whether any of the plurality of packets includes event dependent or event independent data, that at least one of the received augmented packets was received in an order different from the sequence between the plurality of packets by comparing the data indicative of the sequence with the corresponding timestamp of each received augmented packet to determine if the order of receipt of the received augmented packets corresponds to the sequence between the received augmented packets; and based on the determination, delaying, by the processor, processing of the electronic data message.

16. The computer implemented method of claim 15, wherein the processor does not distinguish between inadvertent and intentionally optimistic messaging behavior by the source.

17. The computer implemented method of claim 15, wherein the processor does not distinguish between inadvertent and intentional reordering of the sequence of the plurality of packets by the source.

18. The computer implemented method of claim 15, wherein the processing of the electronic data message comprises forwarding the electronic data message to a destination, the computer implemented method further comprising:
   delaying, by the processor, forwarding the electronic data message by a time delay, and
   adjusting, by the processor, a time of receipt accorded to the electronic data message based on the time delay.

19. The computer implemented method of claim 15, wherein the processing of the electronic data message comprises forwarding the electronic data message to a destination, the computer implemented method further comprising:
   delaying, by the processor, forwarding the electronic data message by a time delay, the time delay being computed based on a size for the electronic data message by calculating a product of the size and a serialization time for the electronic data message, and
   adjusting, by the processor, a time of receipt accorded to the electronic data message based on the product.

20. The computer implemented method of claim 15, wherein the processing of the electronic data message comprises forwarding the electronic data message to a destination, the computer implemented method further comprising:
   delaying, by the processor, forwarding the electronic data message by a time delay, the time delay being computed based on a variance in serialization time for the electronic data message; and
   adjusting, by the processor, a time of receipt accorded to the electronic data message based on the variance.

21. The computer implemented method of claim 15, wherein upon the plurality of packets being received by the processor in an order different from the sequence of those plurality of packets, the computer implemented method further comprises:

incrementing, by the processor, a counter operative to count how many electronic data messages have been received from the source;

comparing, by the processor, the counter to a threshold; and when the counter exceeds the threshold, disconnecting, by the processor, the source.

22. The computer implemented method of claim 21, further comprising:
   receiving, by the processor, periodic heartbeat messages from the source, and
   incrementing, by the processor, the counter when the processor determines that less than all of the plurality of packets were received prior to receipt of a heartbeat message of the periodic heartbeat messages.

23. The computer implemented method of claim 15, wherein the electronic data message comprises data indicative of a message type, at least one message characteristic, and a message payload.

24. The computer implemented method of claim 23, wherein the message type comprises a TCP/IP message or an iLink 3 message.

25. The computer implemented method of claim 23, wherein the at least one message characteristic is a size of the electronic data message.

26. The computer implemented method of claim 15, wherein the source corresponds to at least one of a plurality of market participants.

27. The computer implemented method of claim 15, wherein the processing of the electronic data message comprises forwarding the electronic data message to a network switch, a financial market, or a buffer.

28. A system comprising:
   means for receiving, from a source via a network, a plurality of packets of an electronic data message for processing, each packet of the plurality of packets including either event dependent or event independent data and further characterized by data indicative of a sequence of that packet relative to others of the plurality of packets of the electronic data message;
   means for augmenting each received packet with a timestamp upon receipt indicative of the time thereof;
   means for determining, without regard as to whether any of the plurality of packets includes event dependent or event independent data, that at least one of the received augmented packets was received in an order different from the sequence between the plurality of packets by comparing the data indicative of the sequence with the corresponding timestamp of each received augmented packet to determine if the order of receipt of the received augmented packets corresponds to the sequence between the received augmented packets; and
   means for, based on the determining, delaying processing of the electronic data message.

* * * * *